(12) United States Patent
Akiyoshi et al.

(10) Patent No.: US 10,938,238 B2
(45) Date of Patent: Mar. 2, 2021

(54) ELECTRONIC APPARATUS AND FEED SYSTEM

(71) Applicant: SONY CORPORATION, Tokyo (JP)

(72) Inventors: Koichi Akiyoshi, Chiba (JP); Yoichi Uramoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/454,110

(22) Filed: Jun. 27, 2019

(65) Prior Publication Data
US 2019/0319485 A1    Oct. 17, 2019

Related U.S. Application Data

(63) Continuation of application No. 14/359,167, filed as application No. PCT/JP2012/082024 on Dec. 11, 2012, now Pat. No. 10,389,175.

(30) Foreign Application Priority Data

Dec. 22, 2011   (JP) ............................. JP2011-281215
Apr. 17, 2012   (JP) ............................. JP2012-093837

(51) Int. Cl.
*H02J 50/05*       (2016.01)
*H02J 50/80*       (2016.01)
(Continued)

(52) U.S. Cl.
CPC ............. *H02J 50/05* (2016.02); *H01M 10/44* (2013.01); *H01M 10/488* (2013.01);
(Continued)

(58) Field of Classification Search
CPC .................................. H02J 50/12; H02J 50/00
(Continued)

(56) References Cited

U.S. PATENT DOCUMENTS 4,386,308 A * 5/1983 Emile, Jr. ............. H02J 7/0091
                                                              307/48
4,535,252 A    8/1985 Jacobs
(Continued)

FOREIGN PATENT DOCUMENTS

JP   06-269135 A    9/1994
JP   2001-102974    4/2001
(Continued)

OTHER PUBLICATIONS

International Search Report dated Mar. 5, 2013 in PCT/JP2012/082024.
(Continued)

*Primary Examiner* — David V Henze-Gongola
*Assistant Examiner* — Tarikh Kanem Rankine
(74) *Attorney, Agent, or Firm* — Oblon, McClelland, Maier & Neustadt, L.L.P.

(57) ABSTRACT

An electronic apparatus includes: a power reception section configured to receive power transmitted with use of a magnetic field or an electric field; a secondary battery; a charging section configured to perform charging to the secondary battery, based on received power received by the power reception section; a load configured to perform predetermined operation, based on supplied power; and a control section configured to forcibly set a power path on a preceding side of the load to a predetermined state when the load is activated in the charging to the secondary battery.

20 Claims, 22 Drawing Sheets

(51) Int. Cl.
*H02J 50/40* (2016.01)
*H02J 7/00* (2006.01)
*H02J 50/12* (2016.01)
*H01M 10/44* (2006.01)
*H01M 10/48* (2006.01)
*H02J 7/02* (2016.01)
*H02J 50/00* (2016.01)
*H02J 50/10* (2016.01)
*H01M 10/42* (2006.01)

(52) U.S. Cl.
CPC .......... *H02J 7/0047* (2013.01); *H02J 7/0068* (2013.01); *H02J 7/025* (2013.01); *H02J 50/12* (2016.02); *H02J 50/40* (2016.02); *H02J 50/80* (2016.02); *H01M 2010/4278* (2013.01); *H02J 7/0049* (2020.01); *H02J 50/00* (2016.02); *H02J 50/10* (2016.02); *H02J 2207/20* (2020.01)

(58) Field of Classification Search
USPC .......................................................... 320/108
See application file for complete search history.

(56) References Cited

U.S. PATENT DOCUMENTS

| | | | | |
|---|---|---|---|---|
| 4,626,765 A * | 12/1986 | Tanaka | ................ | G01R 13/406 320/127 |
| 4,758,772 A * | 7/1988 | Lang | ................ | G01R 19/16542 320/136 |
| 6,252,376 B1 * | 6/2001 | Nakamura | ............ | B60L 3/0046 320/132 |
| 6,469,472 B1 * | 10/2002 | Aoshima | ................ | H02J 50/10 320/122 |
| 8,410,810 B2 * | 4/2013 | Xie | ........................ | G01R 31/40 320/134 |
| 2002/0006814 A1 | 1/2002 | Fukunishi | ............. | H02J 7/0031 455/572 |
| 2002/0190689 A1 | 12/2002 | Nakamura | | |
| 2003/0128010 A1 * | 7/2003 | Hsu | ........................ | H02J 7/35 320/101 |
| 2005/0110462 A1 | 5/2005 | Ullrich et al. | | |
| 2005/0168189 A1 * | 8/2005 | Schweigert | ............. | H02J 9/005 320/107 |
| 2005/0194929 A1 * | 9/2005 | Funabashi | ................. | B25F 5/00 320/114 |
| 2005/0200335 A1 | 9/2005 | Yano | | |
| 2007/0129768 A1 | 6/2007 | He | | |
| 2008/0061742 A1 * | 3/2008 | Funabashi | ........... | H01M 10/425 320/127 |
| 2008/0252254 A1 | 10/2008 | Osada | | |
| 2009/0195214 A1 * | 8/2009 | Gehrke | ................. | H02J 7/0068 320/137 |
| 2010/0013321 A1 | 1/2010 | Onishi et al. | | |
| 2010/0188238 A1 | 7/2010 | Yasuda et al. | | |
| 2010/0201315 A1 | 8/2010 | Oshimi | | |
| 2010/0244782 A1 | 9/2010 | Nagayama | | |
| 2011/0291479 A1 | 12/2011 | Lee | | |
| 2012/0013189 A1 * | 1/2012 | Jenkins | ..................... | H02J 1/14 307/80 |
| 2013/0162206 A1 * | 6/2013 | Takeuchi | ................ | H02J 7/025 320/108 |

FOREIGN PATENT DOCUMENTS

| | | |
|---|---|---|
| JP | 2002-34169 | 1/2002 |
| JP | 2003-134699 A | 5/2003 |
| JP | 2005-110399 | 4/2005 |
| JP | 2005-261018 A | 9/2005 |
| JP | 2006-238653 A | 9/2006 |
| JP | 2008-206233 | 9/2008 |
| JP | 2010-63245 | 3/2010 |
| WO | WO 2000/27531 | 5/2000 |

OTHER PUBLICATIONS

Combined Chinese Office Action and Search Report dated Oct. 10, 2015 in Patent Application No. 201280061870.9 (with English language translation).
Office Action dated Apr. 5, 2016 in Japanese Patent Application No. 2012-093837.
Office Action dated May 24, 2016 to Chinese Patent Application No. 201280061870.9, with English translation.

* cited by examiner

FIG. 12    EXAMPLE 2 (IN CHARGING, DURING NORMAL OPERATION)

EXAMPLE 2 (IN CHARGING, WITH SURPLUS POWER: AT ACTIVATION)

ELECTRONIC APPARATUS AND FEED SYSTEM

CROSS-REFERENCE TO RELATED APPLICATIONS

This application is a continuation of and claims the benefit of priority from U.S. application Ser. No. 14/359,167, filed May 19, 2014, which is a national stage of International Application No. PCT/JP2012/082024, filed Dec. 11, 2012, which is based upon and claims the benefit of priority of Japanese Patent Applications No. 2011-281215, filed on Dec. 22, 2011, and No. 2012-93837, filed on Apr. 17, 2012, both filed with the Japan Patent Office. The entire contents of the above applications are hereby incorporated herein by reference.

TECHNICAL FIELD

The present disclosure relates to a feed system performing non-contact power supply (power transmission) on a unit to be fed with power such as an electronic apparatus, and to an electronic apparatus applied to such a feed system.

BACKGROUND ART

In recent years, a feed system (a non-contact feed system, or a wireless charging system) performing non-contact power supply (power transmission) on consumer electronics devices (CE devices) such as mobile phones and portable music players has attracted attention. Accordingly, charging is allowed to be started by not inserting (connecting) a connector of a power supply such as an AC adapter into a unit but placing an electronic apparatus (a secondary-side unit) on a charging tray (a primary-side unit). In other words, terminal connection between the electronic apparatus and the charging tray is unnecessary.

As a method of performing non-contact power supply in such a way, an electromagnetic induction method is well known. In addition, a non-contact feed system using a method called magnetic resonance method that uses electromagnetic resonance phenomenon has attracted attention. Such a non-contact feed system has been disclosed in, for example, PTLs 1 to 6.

CITATION LIST

Patent Literature

PTL 1: Japanese Unexamined Patent Application Publication No. 2001-102974
PTL 2: International Publication No. WO00-27531
PTL 3: Japanese Unexamined Patent Application Publication No. 2008-206233
PTL 4: Japanese Unexamined Patent Application Publication No. 2002-34169
PTL 5: Japanese Unexamined Patent Application Publication No. 2005-110399
PTL 6: Japanese Unexamined Patent Application Publication No. 2010-63245

SUMMARY OF INVENTION

Incidentally, in the non-contact feed system as described above, typically, a state (an apparatus state) of a unit to be fed with power such as an electronic apparatus and a state of a load in such an apparatus are grasped and appropriately controlled, and improvement in usability of a user is desired.

Therefore, it is desirable to provide an electronic apparatus and a feed system that are capable of improving usability of a user at the time of performing power transmission using a magnetic field or an electric field.

An electronic apparatus according to an embodiment of the disclosure includes: a power reception section configured to receive power transmitted with use of a magnetic field or an electric field; a secondary battery; a charging section configured to perform charging to the secondary battery, based on received power received by the power reception section; a load configured to perform predetermined operation, based on supplied power; and a control section configured to forcibly set a power path on a preceding side of the load to a predetermined state when the load is activated in the charging to the secondary battery.

A feed system according to an embodiment of the disclosure includes one or a plurality of the electronic apparatuses (units to be fed with power) according to the above-described embodiment of the disclosure and a feed unit that performs power transmission on the electronic apparatuses with use of a magnetic field or an electric field.

In the electronic apparatus and the feed system according to the respective embodiments of the disclosure, when the load is activated in charging to the secondary battery based on the power (received power) transmitted using a magnetic field or an electric field, the power path on the preceding side of the load is forcibly set to the predetermined state. Accordingly, occurrence of a failure phenomenon caused by activation of the load in charging (for example, occurrence of unnatural discontinuous state in the informing operation of the apparatus state of the electronic apparatus (intermittent informing operation), forcible stoppage of the load caused by shortage of supply power, and the like) is avoided.

According to the electronic apparatus and the feed system according to the respective embodiments of the disclosure, when the load is activated in charging to the secondary battery based on the power transmitted with use of a magnetic field or an electric field, the power path on the preceding side of the load is forcibly set to the predetermined state. Therefore, occurrence of a failure phenomenon caused by the activation of the load in charging is allowed to be avoided. Consequently, it is possible to improve usability of a user in power transmission using a magnetic field or an electric field.

DESCRIPTION OF EMBODIMENTS

Some embodiments of the present disclosure will be described in detail below with reference to drawings. Note that description will be given in the following order.
1. First embodiment (an example in which a state is fixed to a lighting state when a load is activated in charging)
2. Second embodiment (an example in which a state is fixed to a lighting-off state when a load is activated in charging)
3. Third embodiment (an example in which techniques of the first and second embodiments are combined and used)
4. Modification (an example in which a power supply path to a load is blocked when a load is activated in charging)
5. Other modifications (an example of a feed system performing non-contact power transmission using an electric field, etc.)

First Embodiment (General Configuration of Feed System 4)

Figure 1:
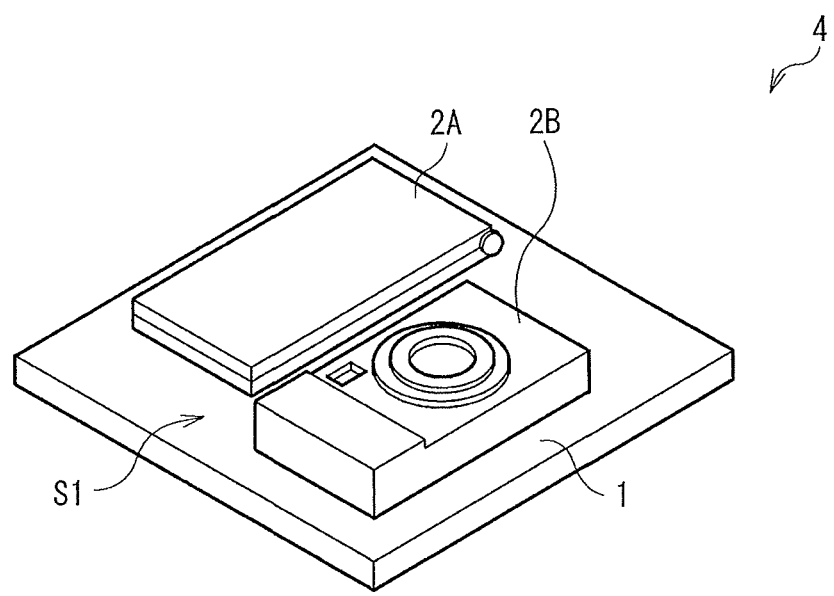
FIG. 1 is a perspective view illustrating an appearance configuration example of a feed system according to a first embodiment of the present disclosure.
Figure 2:
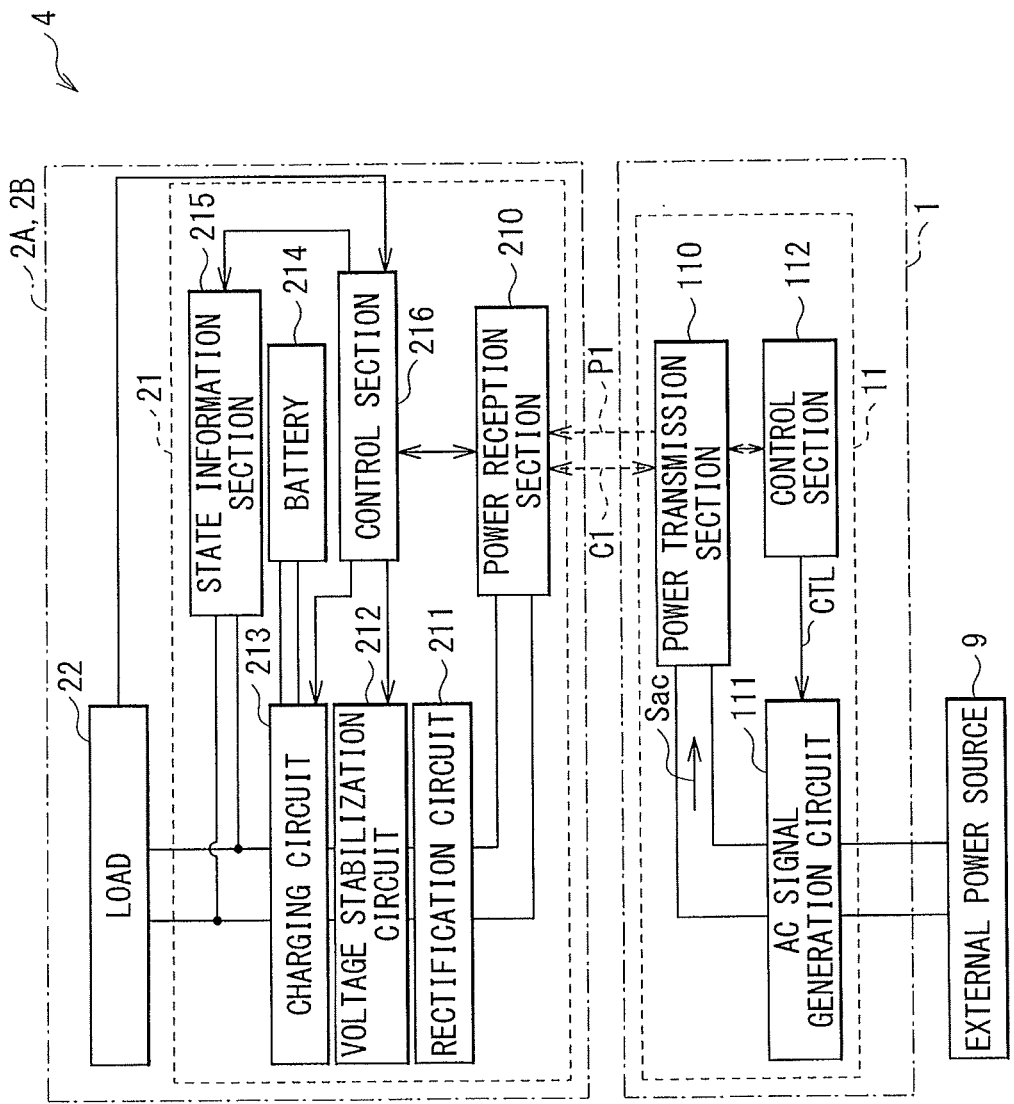
FIG. 2 is a block diagram illustrating a detailed configuration example of the feed system illustrated in FIG. 1.

FIG. 1 illustrates an appearance configuration example of a feed system (a feed system 4) according to a first embodiment of the present disclosure, and FIG. 2 illustrates a block configuration example of the feed system 4. The feed system 4 is a system (a non-contact feed system) performing non-contact power transmission (power supply, power feeding, or power transmission) with use of a magnetic field (with use of magnetic resonance, electromagnetic induction, and the like, hereinafter the same). The feed system 4 includes a feed unit 1 (a primary-side unit), and one or a plurality of electronic apparatuses (in this case, two electronic apparatuses 2A and 2B, secondary-side units) as units to be fed with power.

As illustrated in FIG. 1, for example, in the feed system 4, the electronic apparatuses 2A and 2B are placed (or closely disposed) on a feeding surface (a power transmission surface) S1 of the feed unit 1 so that the power transmission is performed from the feed unit 1 to the electronic apparatuses 2A and 2B. In this case, in consideration of the case where the power transmission is performed to the plurality of electronic apparatuses 2A and 2B at the same time or in a time-divisional manner (sequentially), the feed unit 1 has a mat shape (a tray shape) in which an area of the feeding surface S1 is larger than the size of the electronic apparatuses 2A and 2B, etc., to be fed with power.

(Feed Unit 1)

As described above, the feed unit 1 is a unit (a charging tray) transmitting power (performing power transmission) to the electronic apparatuses 2A and 2B with use of a magnetic field. As illustrated in FIG. 2, for example, the feed unit 1 may include a power transmission device 11 including a power transmission section 110, an AC signal generation circuit (a high-frequency power generation circuit) 111, and a control section 112.

The power transmission section 110 is configured to include a power transmission coil (a primary-side coil) L1, capacitors C1p and C1s (resonance capacitors), and the like, which will be described later. The power transmission section 110 uses the power transmission coil L1 and the capacitors C1p and C1s to transmit power (perform power transmission) to the electronic apparatuses 2A and 2B (in detail, a power reception section 210 described later) with use of an AC magnetic field (see power P1 illustrated by an arrow in FIG. 2). More specifically, the power transmission section 110 has a function of radiating a magnetic field (a magnetic flux) from the feeding surface S1 toward the electronic apparatuses 2A and 2B. The power transmission section 110 further has a function of performing predetermined mutual communication operation with the power reception section 210 described later (see an arrow C1 in FIG. 2).

For example, the AC signal generation circuit 111 may be a circuit that uses power supplied from an external power source 9 (a master power source) of the feed unit 1 to generate a predetermined AC signal Sac (high-frequency power) for power transmission. Such an AC signal generation circuit 111 may be configured using, for example, a switching amplifier described later. Note that, as the external power source 9, for example, a power source (power supply capacity: 500 mA, source voltage: about 5 V) of universal serial bus (USB) 2.0 that is provided in personal computer (PC) or the like may be used.

The control section 112 performs various control operation in the entire feed unit 1 (the entire feed system 4).

Specifically, the control section 112 may include a function of performing appropriate control of the transmitted power, a function of authenticating a secondary-side unit, a function of determining whether a secondary-side unit is placed on a primary-side unit, a function of detecting mixture of a dissimilar metal and the like, etc., in addition to the function of controlling the power transmission by the power transmission section 110. In this case, in the above-described power transmission control, the control section 112 uses a predetermined control signal CTL (a control signal for power transmission) described later, to control the operation of the AC signal generation circuit 111. Moreover, the control section 112 has a function of performing modulation processing by pulse width modulation (PWM) described later with use of the control signal CTL.

(Electronic Apparatuses 2A and 2B)

For example, the electronic apparatuses 2A and 2B are each configured of a stationary electronic apparatus typified by a television receiver, a portable electronic apparatus including a rechargeable battery (battery), typified by a mobile phone and a digital camera, or the like. For example, as illustrated in FIG. 2, these electronic apparatuses 2A and 2B each may include a power reception device 21, and a load 22 that performs predetermined operation (operation exerting functions as an electronic apparatus) based on power supplied from the power reception device 21. In addition, the power reception device 21 includes the power reception section 210, a rectification circuit 211, a voltage stabilization circuit 212, a charging circuit 213 (a charging section), a battery 214 (a secondary battery), a state informing section 215, and a control section 216.

The power reception section 210 is configured to include a power reception coil (a secondary-side coil) L2, capacitors C2$p$ and C2$s$ (resonance capacitors), and the like, that will be described later. The power reception section 210 has a function of receiving power transmitted from the power transmission section 110 in the feed unit 1 with use of the power reception coil L2, the capacitors C2$p$ and C2$s$, and the like. The power reception section 210 also has a function of performing the above-described predetermined mutual communication operation with the power transmission section 110 (see the arrow C1 in FIG. 2).

The rectification circuit 211 is a circuit that rectifies the power (AC power) supplied from the power reception section 210 to generate DC power.

The voltage stabilization circuit 212 is a circuit that performs predetermined voltage stabilization operation, based on the DC power supplied from the rectification circuit 211.

The charging circuit 213 is a circuit that performs charging on the battery 214, based on the DC power subjected to voltage stabilization supplied from the voltage stabilization circuit 212.

The battery 214 stores therein power in response to the charging by the charging circuit 213, and may be configured using a rechargeable battery (a secondary battery) such as a lithium ion battery.

Figure 3:
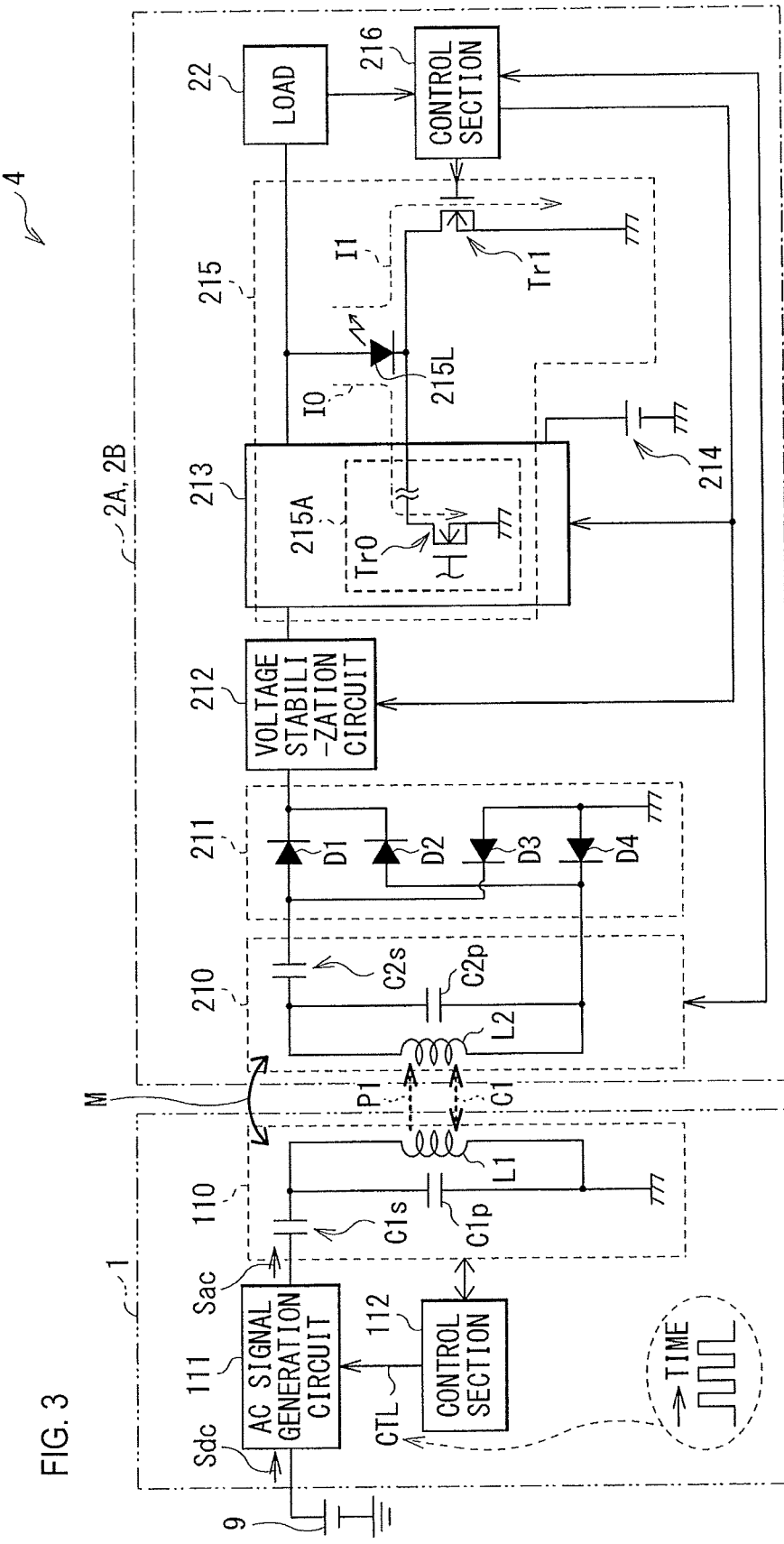
FIG. 3 is a circuit diagram illustrating a detailed configuration example of each block illustrated in FIG. 2.

The state informing section 215 informs (notifies, or presents) the outside (a user, etc.) of own apparatus state (in this case, the electronic apparatus 2A or the electronic apparatus 2B). Specifically, the state informing section 215 has a function of informing the outside of such an apparatus state with use of a lighting state (a display state) of an light emitting element or the like that will be described later, audio output by a speaker or others, etc. In addition, the state informing section 215 informs, as apparatus states in this case, a state in charging to the battery 214 by the charging circuit 213 and a state after completion of the charging, and an abnormal state of the battery 214, by distinguished informing mode. Note that the detailed configuration of the state informing section 215 will be described later (FIG. 3).

The control section 216 performs various control operation in the entire electronic apparatuses 2A and 2B (the entire feed system 4). Specifically, for example, the control section 216 may have a function of performing control of power reception and communication by the power reception section 110, and a function of controlling operation of the voltage stabilization circuit 212, the charging circuit 213, the state informing section 215, and the like.

In this example, the control section 216 has a function of forcibly setting the power path on a preceding side of the load 22 to a predetermined state when the load 22 is activated in charging to the battery 214. More specifically, in the present embodiment, when the load 22 is activated in charging, the control section 216 forcibly sets the above-described power path to forcibly fix the informing mode by the state informing section 215. Note that the detail of the control operation of the state informing section 215 by the control section 216 will be described later.

(Detailed Configurations of Feed Unit 1 and Electronic Apparatuses 2A and 2B)

FIG. 3 is a circuit diagram illustrating a detailed configuration example of each block in the feed unit 1 and the electronic apparatuses 2A and 2B illustrated in FIG. 2.

(Power Transmission Section 110)

The power transmission section 110 includes the power transmission coil L1 to perform power transmission using a magnetic field (to generate a magnetic flux), and the capacitors C1$p$ and C1$s$ to form, together with the power transmission coil L1, an LC resonance circuit. The capacitor C1$s$ is electrically connected in series to the power transmission coil L1. In other words, an end of the capacitor C1$s$ and an end of the power transmission coil L1 are connected to each other. Moreover, the other end of the capacitor C1$s$ and the other end of the power transmission coil L1 are connected in parallel to the capacitor C1$p$, and the connection end of the power transmission coil L1 and the capacitor C1$p$ is grounded.

The LC resonance circuit configured of the power transmission coil L1 and the capacitors C1$p$ and C1$s$, and an LC resonance circuit described later configured of the power reception coil L2 and the capacitors C2$p$ and C2$s$ are magnetically coupled with each other. As a result, LC resonance operation by a resonance frequency that is substantially the same as that of the high-frequency power (the AC signal Sac) described later generated by the AC signal generation circuit 111, is performed.

(AC Signal Generation Circuit 111)

Figure 4:
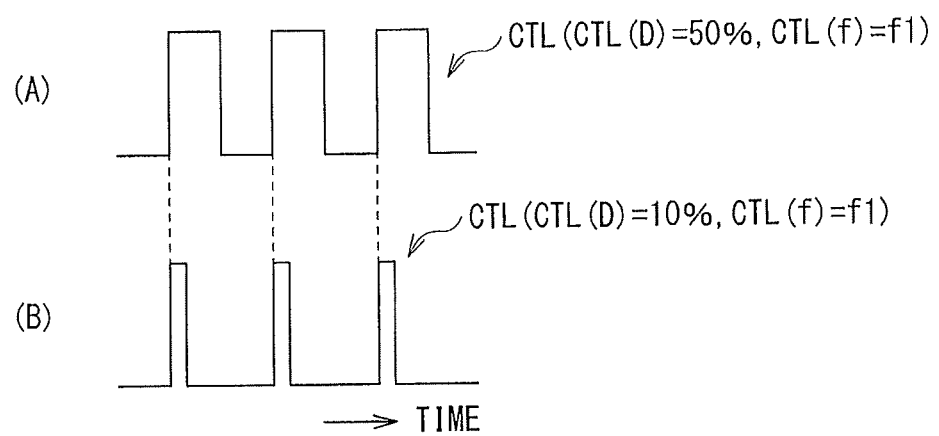
FIG. 4 is a timing waveform chart illustrating an example of a control signal to an AC signal generation circuit.

The AC signal generation circuit 111 is configured using a switching amplifier (a so-called class-E amplifier) that has one transistor (not illustrated) as a switching device. The control signal CTL for the power transmission is supplied from the control section 112 to the AC signal generation circuit 111. The control signal CTL is formed of a pulse signal having a predetermined duty ratio as illustrated in FIG. 3. Moreover, for example, as illustrated in (A) and (B) of FIG. 4, the duty ratio of the control signal CTL is controlled to perform pulse width modulation described later.

With such a configuration, in the AC signal generation circuit 111, the above-described transistor performs ON-OFF operation (switching operation by a predetermined frequency and the duty ratio), according to the control signal CTL for the power transmission. Specifically, the ON-OFF operation of the transistor as the switching device is controlled with use of the control signal CTL supplied from the control section 112. Accordingly, the AC signal Sac (AC power) is generated based on a DC signal Sdc that is input from, for example, the external power source 9 side, and the AC signal Sac is supplied to the power transmission section 110.

(Power Reception Section 210)

The power reception section 210 includes a power reception coil L2 to receive the power (from the magnetic flux) transmitted from the power transmission section 110 and the capacitors C2p and C2s to form, together with the power reception coil L2, an LC resonance circuit. The capacitor C2p is electrically connected in parallel to the power reception coil L2, and the capacitor C2s is electrically connected in series to the power reception coil L2. In other words, an end of the capacitor C2s is connected to an end of the capacitor C2p and an end of the power reception coil L2. In addition, the other end of the capacitor C2s is connected to one of input terminals of the rectification circuit 211, and the other end of the power reception coil L2 and the other end of the capacitor C2p are connected to the other input terminal of the rectification circuit 211.

The LC resonance circuit configured of the power reception coil L2 and the capacitors C2p and Cs2 and the above-described LC resonance circuit configured of the power transmission coil L1 and the capacitors C1p and C1s are magnetically coupled with each other. As a result, LC resonance operation by a resonance frequency that is substantially the same as that of the high-frequency power (the AC signal Sac) generated by the AC signal generation circuit 111, is performed.

(Rectification Circuit 211)

The rectification circuit 211 is configured using four rectification elements (diodes) D1 to D4 in this case. Specifically, an anode of the rectification element D1 and a cathode of the rectification element D3 are connected to one of the input terminals of the rectification circuit 211, a cathode of the rectification element D1 and a cathode of the rectification element D2 are connected to an output terminal of the rectification circuit 211. In addition, an anode of the rectification element D2 and a cathode of the rectification element D4 are connected to the other input terminal of the rectification circuit 211, and an anode of the rectification element D3 and an anode of the rectification element D4 are grounded. With this configuration, the rectification circuit 211 rectifies the AC power supplied from the power reception section 210, and supplies DC power (received power) to the voltage stabilization circuit 212.

(Charging Circuit 213)

The charging circuit 213 performs charging on the battery 214 based on the DC power (received power) subjected to the voltage stabilization as described above. The charging circuit 213 also includes therein a lighting control section 215A in the state informing section 215 described below.

(State Informing Section 215)

The state informing section 215 also informs the outside of the above-described apparatus state, based on the DC power (received power) subjected to the voltage stabilization. As illustrated in FIG. 3, the state informing section 215 has a light emitting element (a lighting section) 215L configured of a light emitting diode (LED) or the like, the above-described lighting control section 215A, and one (one kind of) transistor Tr1 (a first switching device) as a switching device. Note that the transistor Tr1 is configured of an n-type FET (field effective transistor) in this case.

The light emitting element 215L is an element playing a role of informing the apparatus state (the state in charging, the state after completion of the charging, and the abnormal state described above), depending on the lighting state (such as a lighting state, an lighting-off state, and a blinking state). In the light emitting element 215L, an anode is connected on a connection line (a power supply path to the load 22) between the charging circuit 213 and the load 22. Moreover, in this case, a cathode is connected to a terminal of the lighting control section 215A, and a cathode potential is controlled by the lighting control section 215A (specifically, a transistor Tr0 described later) and the transistor Tr1.

The lighting control section 215A controls, in this case, the cathode potential of the light emitting element 215L based on a detection result of the charging state (apparatus state in charging, after completion of the charging, and the like) to the battery 214 by the charging circuit 213 or the like, to control the lighting state (to perform the lighting control) of the light emitting element 215L. More specifically, as illustrated in FIG. 3, the lighting control section 215A sets the transistor Tr0 as the switching device to ON state, and sets the cathode potential of the light emitting element 215L to a ground potential, to allow the current I0 to flow through the light emitting element 215L and to turn on the light emitting element 215L. Moreover, the lighting control section 215A sets the transistor Tr0 to OFF state and sets the cathode potential to a potential other than the ground potential to allow the current I0 not to flow and to turn off the light emitting element 215L. Note that, in this case, the transistor Tr0 is also configured of the n-type FET.

The transistor Tr1 is configured of the n-type FET in this case, a gate thereof receives a control signal from the control section 216, a source thereof is connected to the ground, and a drain thereof is connected to the cathode of the light emitting element 215L. The transistor Tr1 is a device to control the lighting state of the light emitting element 215L to be fixed irrespective of the lighting control by the lighting control section 215A (independent of ON-OFF state of the above-described transistor Tr0) when the load 22 is activated in charging. Specifically, although the detail will be described later, the cathode potential of the light emitting element 215L is set to the ground potential by setting the transistor Tr1 to ON state in response to the control by the control section 216. As a result, a current I1 illustrated in FIG. 3 flows through the light emitting element 215L, and the light emitting element 215L is forcibly turned on (fixed to the lighting state).

(Function and Effects of Feed System 4)

(1. Outline of General Operation)

In the feed system 4, the AC signal generation circuit 111 in the feed unit 1 supplies predetermined high-frequency power (the AC signal Sac) for power transmission, to the power transmission coil L1 and the capacitors C1p and C1s (the LC resonance circuit) in the power transmission section 110, based on the power supplied from the external power source 9. Accordingly, a magnetic field (a magnetic flux) is generated in the power transmission coil L1 in the power transmission section 110. At this time, when the electronic apparatuses 2A and 2B that are units to be fed with power (to be charged) are placed (or closely disposed) on a top surface (the feeding surface S1) of the feed unit 1, the power transmission coil L1 in the feed unit 1 and the power reception coil L2 in each of the electronic apparatuses 2A and 2B are brought close to each other near the feeding surface S1.

In this way, when the power reception coil L2 is disposed near the power transmission coil L1 generating the magnetic field (the magnetic flux), electromotive force is generated in the power reception coil L2 by induction of the magnetic flux generated from the power transmission coil L1. In other words, interlinkage magnetic field is generated in each of the power transmission coil L1 and the power reception coil L2 by electromagnetic induction or magnetic resonance. As a result, power is transmitted from the power transmission coil L1 side (a primary side, the feed unit 1 side, the power transmission section 110 side) to the power reception coil L2 side (a secondary side, the electronic apparatuses 2A and 2B side, the power reception section 210 side) (see the power P1 illustrated by the arrow in FIG. 2 and FIG. 3). At this time, the power transmission coil L1 on the feed unit 1 side and the power reception coil L2 on the electronic apparatuses 2A and 2B side are magnetically coupled with each other by the electromagnetic induction or the like, and thus the LC resonance operation is performed in the above-described LC resonance circuit.

Then, in the electronic apparatuses 2A and 2B, the AC power received by the power reception coil L2 is supplied to the rectification circuit 211, the voltage stabilization circuit 212, and the charging circuit 213, thereby leading to the following charging operation. Specifically, after the AC power is converted into predetermined DC power by the rectification circuit 211 and is subjected to the voltage stabilization by the voltage stabilization circuit 212, charging to the battery 214 based on the DC power is performed by the charging circuit 213. In this way, in the electronic apparatuses 2A and 2B, the charging operation based on the power received by the power reception section 210 is performed.

In other words, in the present embodiment, terminal connection to an AC adopter or the like is not necessary for charging of the electronic apparatuses 2A and 2B, and charging is easily started (non-contact feeding is performed) only by placing (closely disposing) the electronic apparatuses 2A and 2B on the feeding surface S1 of the feed unit 1. This leads to liability relief of a user.

Figure 5:
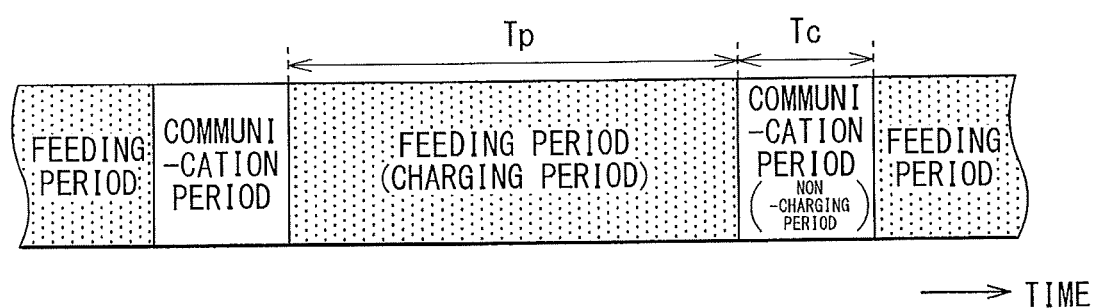
FIG. 5 is a timing chart illustrating an example of a feeding period and a communication period.

In addition, for example, as illustrated in FIG. 5, in such feeding operation, a feeding period Tp (a charging period to the battery 214) and a communication period Tc (a non-charging period) are periodically (or non-periodically) performed in a time-divisional manner. In other words, the control section 112 and the control section 216 performs control so that the feeding period Tp and the communication period Tc are periodically (or non-periodically) set in a time-divisional manner. In this case, the communication period Tc is a period during which mutual communication operation (communication operation for mutual authentication between units, feed efficiency control, or the like) is performed between the primary-side unit (the feed unit 1) and the secondary-side unit (the electronic apparatuses 2A and 2B) with use of the power transmission coil L1 and the power reception coil L2 (see the arrow C1 in FIG. 2 and FIG. 3). Incidentally, the time ratio of the feeding period Tp and the communication period Tc at this time may be, for example, the feeding period Tp: the communication period Tc=about 9:1.

At this time, during the communication period Tc, for example, the communication operation using pulse width modulation may be performed by the AC signal generation circuit 111. Specifically, the duty ratio of the control signal CTL during the communication period Tc is set based on predetermined modulation data, and thus the communication by the pulse width modulation is performed. Note that, since it is difficult in principle to perform frequency modulation at the time of resonance operation by the power transmission section 110 and the power reception section 210 described above, such pulse width modulation is used to achieve the communication operation easily.

(2. State Informing Operation)

In addition, in the feed system 4 according to the present embodiment, a section (the state informing section 215) informing the outside of the respective apparatus states of the electronic apparatuses 2A and 2B is provided in each of the electronic apparatuses 2A and 2B. The state informing section 215 informs the outside of such an apparatus state based on the received power received from the feed unit 1 (directly or indirectly using the received power).

Specifically, the state informing section 215 informs the state in charging to the battery 214 by the charging circuit 213 and the state after completion of the charging and the abnormal state of the battery 214 distinctively according to the lighting state (the lighting state, the lighting-off state, and the blinking state) of the light emitting element 215 in this case. In other words, for example, the lighting control section 215A in the state informing section 215 may control the light emitting element 215L to be turned on in the charging state, may control the light emitting element 215L to be turned off in the state after completion of the charging, and may control the light emitting element 215L to blink in the above-described abnormal state.

Figure 6:
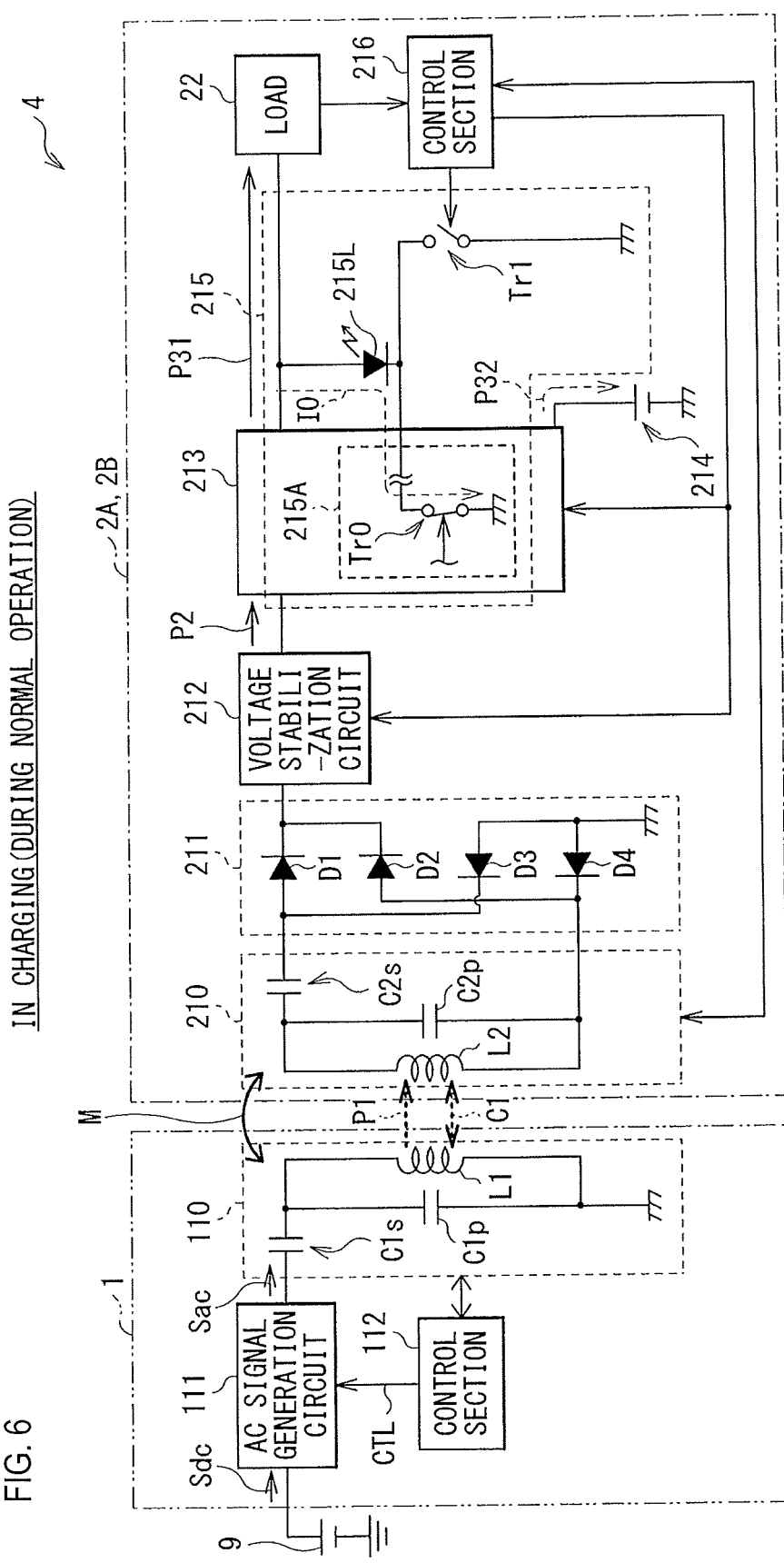
FIG. 6 is a circuit diagram illustrating an operation example during a charging period at the time of normal operation.

Specifically, for example, as illustrated in FIG. 6, at the time of normal operation except for the time of the activation of the load 22 described later, in charging to the battery 214, the operation is performed in the following manner. More specifically, first, the charging circuit 213 supplies power P31 to the load 22, based on the power P2 supplied from the voltage stabilization circuit 212. In addition, at the same time, the charging circuit 213 uses surplus power (power P32) that is obtained by subtracting power (corresponding to the above-described power P31 supplied to the load 22) consumed by the load 22 from the power P2, to perform charging on the battery 214. Then, the lighting control section 215A detects such charging on the battery 214, and then sets the transistor Tr0 to the ON state. Accordingly, the current J0 illustrated in FIG. 6 flows through the light emitting element 215L, and thus the light emitting element 215L is put into the lighting state. As a result, the apparatus state indicating that the charging to the battery 214 is in process is informed to the outside. Note that, at the time of the normal operation, the control section 216 controls the transistor Tr1 described later to be put into the OFF state in this case.

Figure 7:
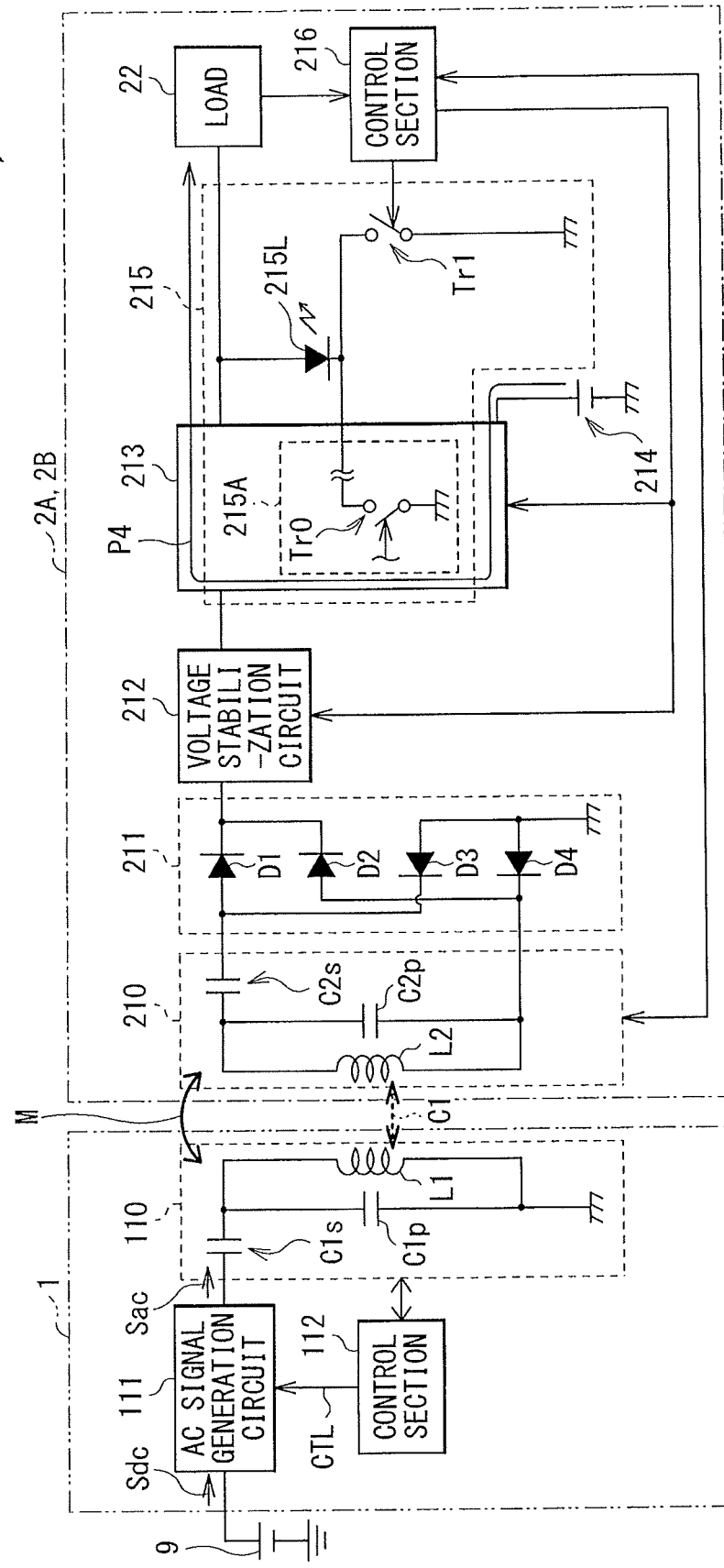
FIG. 7 is a circuit diagram illustrating an operation example after completion of charging at the time of the normal operation.

On the other hand, for example, as illustrated in FIG. 7, at the time of the above-described normal operation, the operation is performed in the following manner after completion of the charging to the battery 214. Specifically, first, the power transmission from the feed unit 1 side to the electronic apparatuses 2A and 2B with use of a magnetic field is stopped after competition of the charging, unlike the operation in changing (before completion of the charging) described above, the power P2 is not supplied to the charging circuit 213. Therefore, the power P31 is not supplied from the charging circuit 213 to the load 22, and charging using the power P32 (surplus power) from the charging circuit 213 to the battery 214 is also not performed. As illustrated in FIG. 6, after completion of the charging, the part (power P4) of the charged power stored in the battery 214 is supplied to the load 22 through the charging circuit 213. Then, the lighting control section 215A detects completion of the charging and sets the transistor Tr0 to the OFF state. Accordingly, the above-described current I0 stops flowing through the light emitting element 215L, and the light emitting element 215L is put into the lighting-off state. As a result, the apparatus state indicating that the charging to the battery 214 is completed is informed to the outside. Note that the control section 216 controls the transistor Tr1 to be put into the OFF state also in this case.

In the electronic apparatuses 2A and 2B, such state informing operation is performed by the state informing section 215 so that the apparatus state at that time is allowed to be informed to a user and the like, which achieves improvement in usability by the user and the like.

Incidentally, in the non-contact feed system like the feed system 4 of the present embodiment, typically, the power transmission efficiency is inferior to (lower than) that in a wired feed system (a feed system using an AC adapter) in many cases. For example, when the power supply is performed using a master power source (2.5 W maximum) by the same USB 2.0, the power loss is inevitably larger in the non-contact system than that in the wired system. This is because, in the non-contact feed system, the DC power is converted into the AC power once and the non-contact feeding is performed using an AC magnetic field, and then the AC power is converted into the DC power again, and an amount of "conversion efficiency" at this time becomes loss.

It is assumed that the power transmission efficiency in the non-contact feeding is 50% as an example. In this case, when the power is received in the wired system, the power of 2.5 W is allowed to be received from the above-described master power source of USB 2.0 because the power transmission efficiency at this time is substantially close to 100%. On the other hand, in the non-contact system, since the power transmission efficiency is 50% as described above, the power to be received is lowered to 1.25 W.

At this time, when it is assumed that the maximum power consumed by the electronic apparatus (the unit to be fed with power) is 2.0 W, there is a margin (surplus power) of 0.5 W (=2.5 W−2.0 W) in the wired system. On the other hand, in the non-contact system, power shortage of 0.75 W (=1.25 W−2.0 W) occurs. In the non-contact feed system, to compensate such a minus amount (the power shortage), a part of the charged power in the charged secondary battery is supplied to the load in the electronic apparatus. Since the surplus power is note generated in the case where the part of the charged power is used in this way, charging to the secondary battery is not obviously performed, and the light emitting element playing a role of the state informing operation is put into the lighting-off state similarly to the case (after completion of the charging) of FIG. 7 described above.

2-1. Comparative Example

Figure 8:
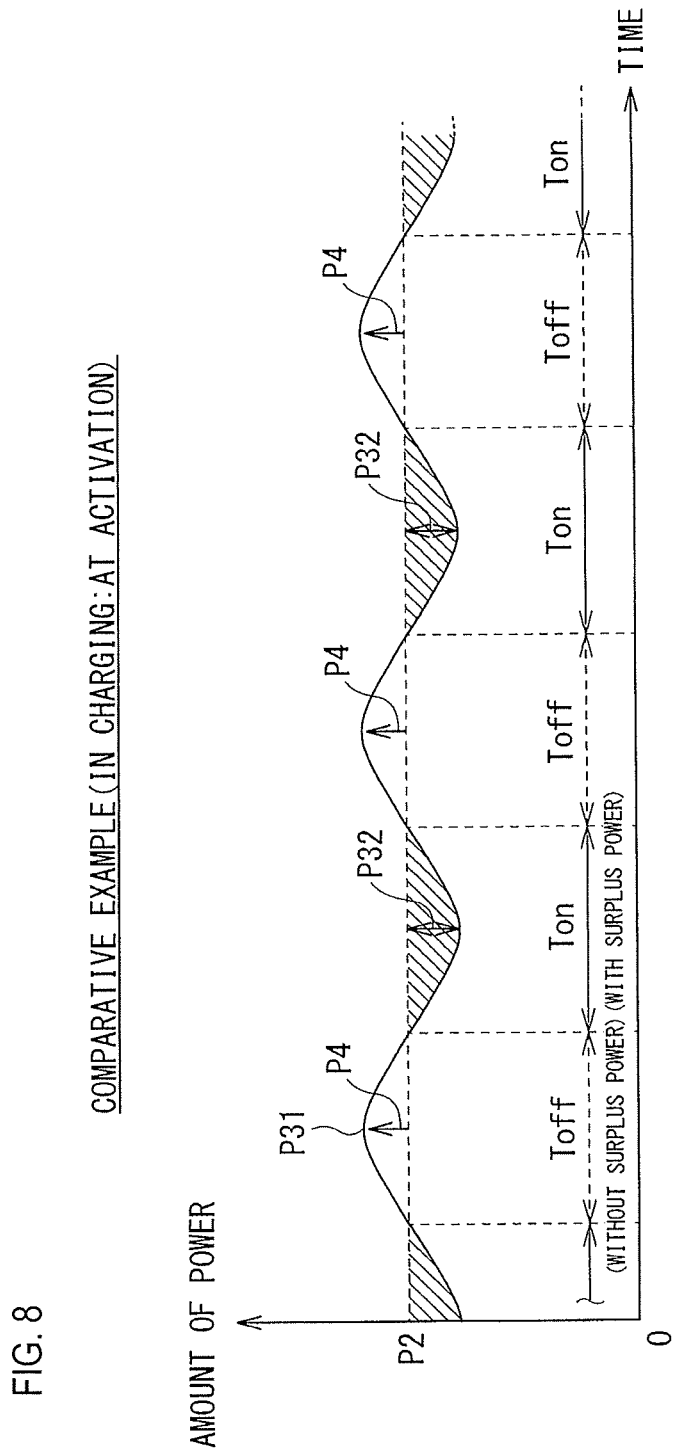
FIG. 8 is a timing chart illustrating an operation example during the charging period at the time of activation of a feed system according to a comparative example.

Accordingly, for example, as with a comparative example illustrated in FIG. 8, the following disadvantage may occur when the load in the electronic apparatus is activated in charging. Specifically, when a state in which the maximum consumed power (corresponding to the above-described power P31 in the figure) in the electronic apparatus exceeds the received power (corresponding to the above-described power P2) obtained by the non-contact feeding using the magnetic field frequently occurs, erroneous determination described below of the apparatus state by the user may occur.

Specifically, as illustrated in FIG. 8, when the magnitude relationship between the supplied power (the power P2) and the consumed power (the power P31) is frequently reversed (in the case where intermittent operation is performed at the time of activation of the load 22, etc.), a period during which the surplus power is generated and a period during which the surplus power is not generated are alternately repeated. In other words, as illustrated in FIG. 8, a period during which the surplus power (the power P32) is generated and the light emitting element 215L is put into the lighting state (a lighting period Ton) and a period during which the surplus power (the power P32) is not generated and the light emitting element 215L is put into the lighting-off state (a lighting-off period Toff) are frequently repeated. This is because, as described above, when the supplied power (the power P2) exceeds the consumed power (the power P31) and the surplus power (the power P32) is thus generated (the lighting period Ton), the charging to the battery 214 is performed and thus the light emitting element 215L is put into the lighting state. In addition, this is because, when the supplied power (the power P2) is lower than the consumed power (the power P31) and thus the surplus power (the power P32) is not generated (the lighting-off period Toff), the power P4 is supplied from the battery 214 to the load 22, as well as the charging to the battery 214 is not performed, and thus the light emitting element 215L is put into the lighting-off state.

As a result, unnatural discontinuous state in the informing operation may occur (intermittent informing operation may occur), and erroneous determination of the apparatus state by the user may occur. Specifically, when the light emitting element 215L is frequently and repeatedly turned on or off irrespective of the normal charging period, the user perceives the light emitting element 215L being blinking, which may cause, for example, misunderstanding that abnormal state of the battery 214 or the like occurs in the electronic apparatuses 2A and 2B. In this way, in the comparative example illustrated in FIG. 8, usability of the user is deteriorated (lowered).

2-2. Embodiment

Therefore, in the feed system 4 of the present embodiment, the above-described disadvantage in the comparative example is resolved in the following manner. Specifically, the control section 216 in each of the electronic apparatuses 2A and 2B forcibly sets the power path on the preceding side of the load 22 to the predetermined state when the load 22 is activated in charging to the battery 214.

In the present embodiment in particular, when the load 22 is activated in charging, the control section 216 forcibly sets the above-described power path to forcibly fix the informing mode by the state informing section 215. In other words, in such a case, the control section 216 performs control to allow the lighting state of the light emitting element 215L to be fixed irrespective of the lighting control by the lighting control section 215A (irrespective of the ON-OFF state of the transistor Tr0). More specifically, in the present embodiment, when the load 22 is activated in charging, the control section 216 sets the transistor Tr1 in the state informing section 215 to the ON state and forcibly puts the power path (in this case, the path of the above-described current I1) into the conductive state to fix the light emitting element 215L to the lighting state. In other words, the control section 216 controls the gate potential of the transistor Tr1 so that the transistor Tr1 is put into the ON state and the current I1 is forcibly allowed to flow through the light emitting element 215L.

Figure 9:
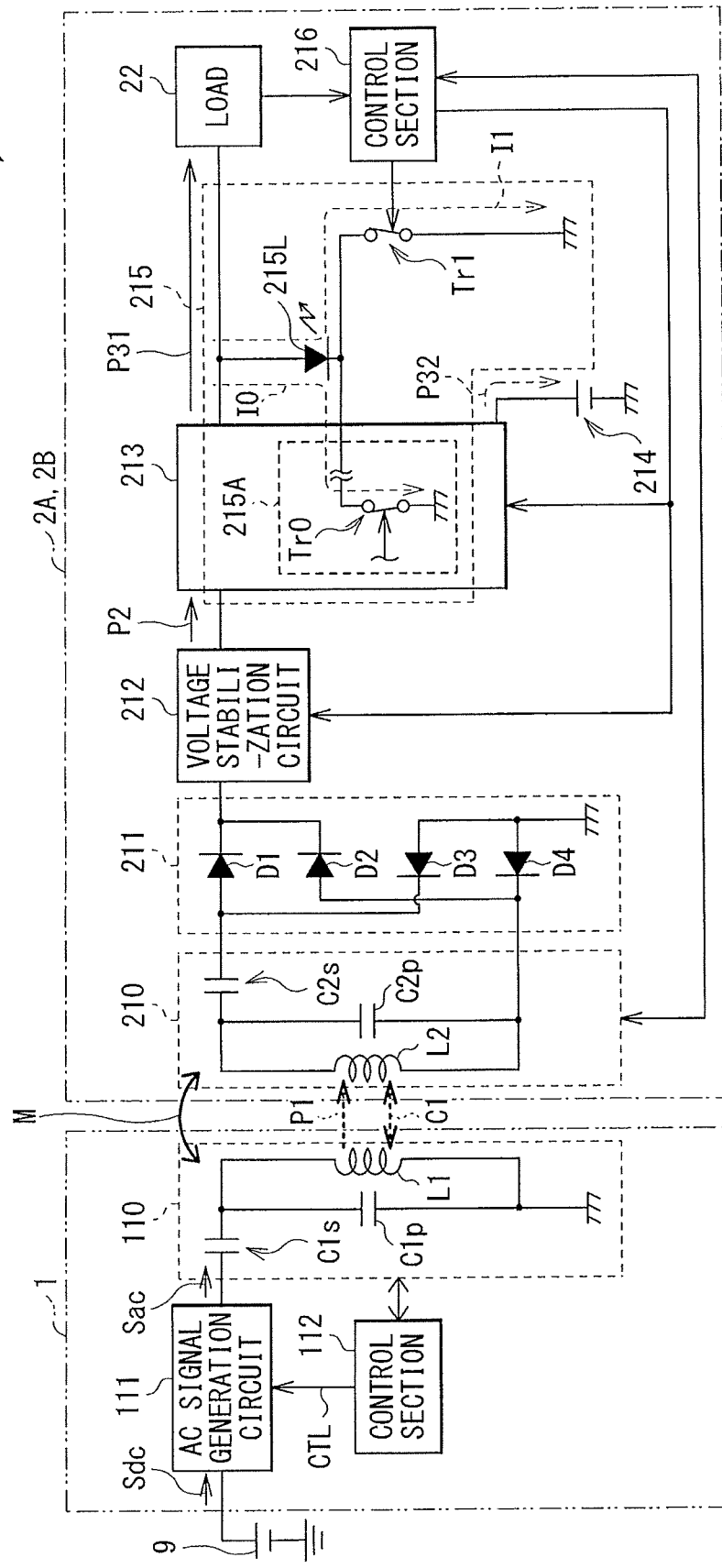
FIG. 9 is a circuit diagram illustrating an operation example during the charging period at the time of activation according to Example 1.

Specifically, for example, as with Example 1 illustrated in FIG. 9, when the load 22 is activated in charging, the operation is performed in the following way during a period during which the above-described surplus power (the power P32) is generated. Specifically, first, the charging circuit 213 supplies the power P31 to the load 22 based on the power P2 supplied from the voltage stabilization circuit 212 similarly to in charging at the time of the normal operation described above. In addition, at the same time, the charging circuit 213 performs charging to the battery 214 with use of the surplus power (the power P32) that is obtained by subtracting the power (corresponding to the power P31) consumed by the load 22 from the power P2. Then, the lighting control section 215A detects that the charging to the battery 214 is in process, and sets the transistor Tr0 to the ON state. In addition, when obtaining and detecting the information indicating that the load 22 is activated from the load 22, the control section 216 sets the transistor Tr1 to the ON state as described above. As a result, the currents I0 and I1 each flow through the light emitting element 215L and the light emitting element 215L is put into the lighting state.

Figure 10:
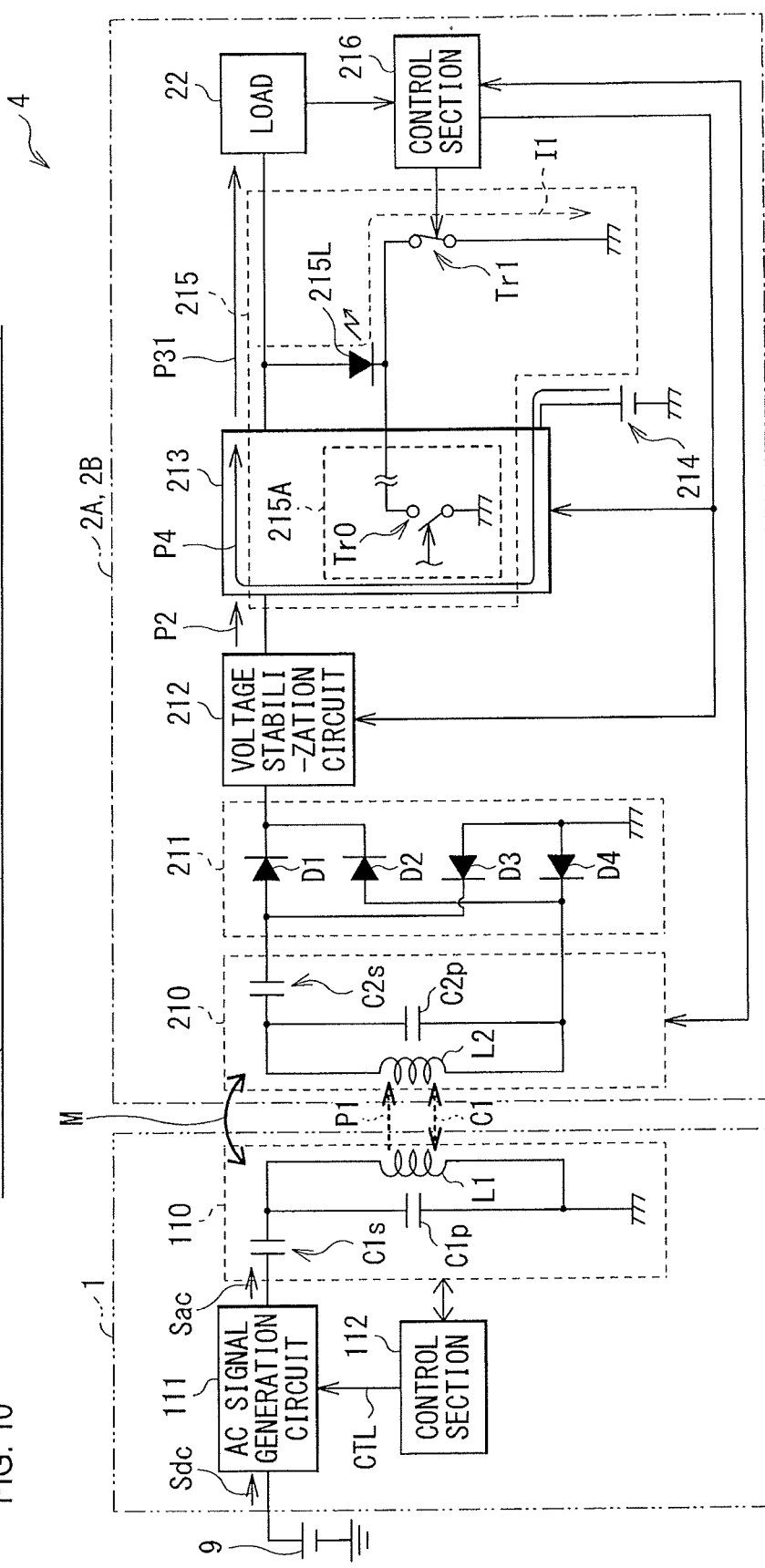
FIG. 10 is a circuit diagram illustrating another operation example during the charging period at the time of the activation according to the Example 1.

On the other hand, for example, as with the Example 1 illustrated in FIG. 10, when the load 22 is activated in charging, the operation is performed in the following manner during a period during which the above-described surplus power (the power P32) is not generated. Specifically, also in this case, the charging circuit 213 supplies the power P31 to the load 22 based on the power P2 supplied from the voltage stabilization circuit 212. Incidentally, the surplus power (the power P32) is not generated in this case, charging with use of the power P32 (the surplus power) from the charging circuit 213 to the battery 214 is not performed. In addition, for this reason, similarly to after the completion of charging at the time of the normal operation described above, the part (the power P4) of the charged power stored in the battery 214 is supplied as the part of the power P31 to the load 22 through the charging circuit 213. On the other hand, the lighting control section 215A detects that the charging to the battery 214 is not performed, and sets the transistor Tr0 to the OFF state. Also in this case, when obtaining and detecting the information indicating that the load 22 is activated from the load 22, the control section 216 sets the transistor Tr1 to the ON state. Therefore, the transistor Tr1 is put into the ON state and the current I1 flows through the light emitting element 215L while the transistor Tr0 is put into the OFF state and the current I0 does not flow, and thus the light emitting element 215L is put into the lighting state. As described above, during the period during which the surplus power is not generated, the control section 216 sets the transistor Tr1 to the ON state to perform control of the cathode potential (set to the ground potential), while the lighting control section 215A does not control the cathode potential of the light emitting element 215L.

As described above, in the present embodiment, when the load 22 is activated in charging to the battery 214 based on the power (the received power) transmitted using the magnetic field, the power path on the preceding side of the load 22 is forcibly set to the predetermined state irrespective of presence of generation of the above-described surplus power. More specifically, the control section 216 sets the transistor Tr1 in the state informing section 215 to the ON state to forcibly put the power path (the path of the current I1) into the conductive state, thereby fixing the light emitting element 215L to the lighting state. Accordingly, the above-described disadvantage in the comparative example caused by the activation of the load 22 in charging is avoided.

Specifically, occurrence of unnatural discontinuous state in the informing operation (intermittent informing operation) is avoided, and erroneous determination of the apparatus state by the user is prevented. More specifically, it is prevented that the light emitting element 215L seems to be blinking even in the normal charging period, and possibility of misunderstanding that abnormal state in the battery 214 or the like occurs in the electronic apparatuses 2A and 2B may be eliminated. In other words, in the present embodiment, the light emitting element 215L is constantly (continuously) in the lighting state irrespective of presence of occurrence of the surplus power during the charging period (the period before completion of the charging).

As described above, in the present embodiment, when the load 22 is activated in charging to the battery 214 based on the power transmitted using the magnetic field in each of the electronic apparatuses 2A and 2B, the power path on the preceding side of the load 22 is forcibly set to the predetermined state. Therefore, occurrence of failure phenomenon caused by the activation of the load 22 in charging is allowed to be avoided. Therefore, when the power transmission is performed with use of the magnetic field, usability of the user is allowed to be improved.

Subsequently, other embodiments (second and third embodiments) of the disclosure will be described below. Note that like numerals are used to designate substantially like components of those according to the first embodiment, and the description thereof is appropriately omitted.

Second Embodiment (Configuration of Feed System 4A)

Figure 11:
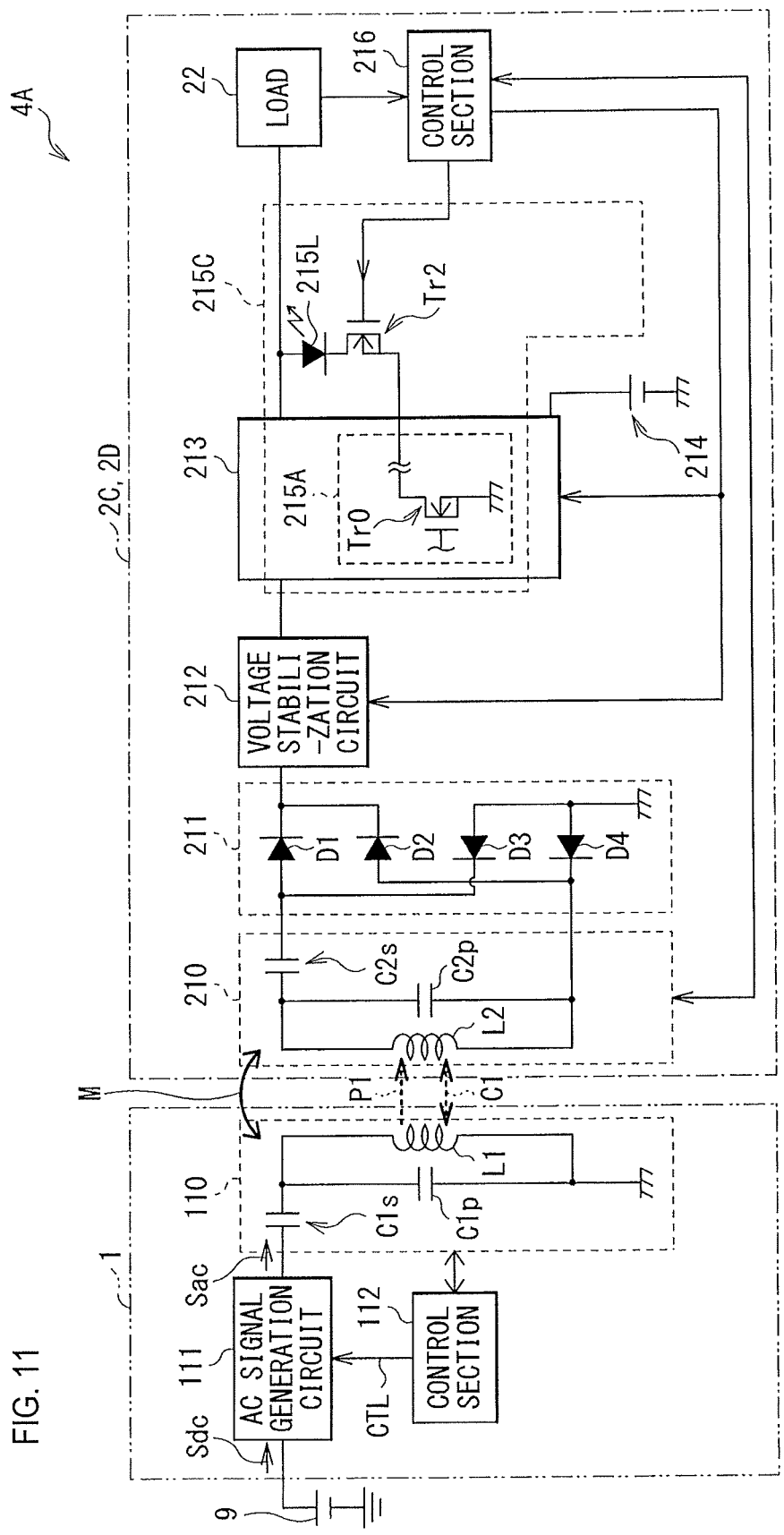
FIG. 11 is a circuit diagram illustrating a configuration example of a feed system according to a second embodiment.

FIG. 11 illustrates a configuration example of a feed system (a feed system 4A) according to the second embodiment, by way of a block diagram and a circuit diagram. The feed system 4A is provided with electronic apparatuses 2C and 2D in place of the electronic apparatuses 2A and 2B as units to be fed with power in the feed system 4A of the first embodiment, and other configurations are similar to those in the feed system 4.

The electronic apparatuses 2C and 2D are each provided with a state informing section 215C described below in place of the state informing section 215 in the electronic apparatuses 2A and 2B, and other configurations are similar to those in each of the electronic apparatuses 2A and 2B.

(State Informing Section 215C)

The state informing section 215C includes the light emitting element 215L, the lighting control section 215A, and one (one kind of) transistor Tr2 (a second switching device) as a switching device. In other words, the state informing section 215C corresponds to the state informing section 215 that includes the transistor Tr2 in place of the transistor Tr1 as a switching device, and other configurations are similar to those in the state informing section 215.

The transistor Tr2 is configured of an n-type FET in this case, a gate thereof receives the control signal from the control section 216, a source thereof is connected to a drain of the transistor Tr0, and a drain thereof is connected to the cathode of the light emitting element 215L. As with the transistor Tr1, the transistor Tr2 is a device to control the lighting state of the light emitting element 215L to be fixed irrespective of the lighting control by the lighting control section 215A (independent of ON-OFF control of the transistor Tr0) when the load 22 is activated in charging.

Incidentally, when the load 22 is activated in charging, the control section 216 in the present embodiment sets the transistor Tr2 to the OFF state as will be described below, and forcibly puts the power path (the path of the current I0 in this case) into the blocked state to fix the light emitting element 215L to the lighting-off state. In other words, unlike (in contrast to) the first embodiment, the control section 216 controls a gate potential of the transistor Tr2 so that the transistor Tr2 is put into the OFF state and the current I0 is forcibly allowed not to flow through the light emitting element 215L.

(Function and Effects of Feed System 4A)

In the feed system 4A with such a configuration, in each of the electronic apparatuses 2C and 2D, the state informing operation is performed in a manner described below.

(During Normal Operation)

Figure 12:
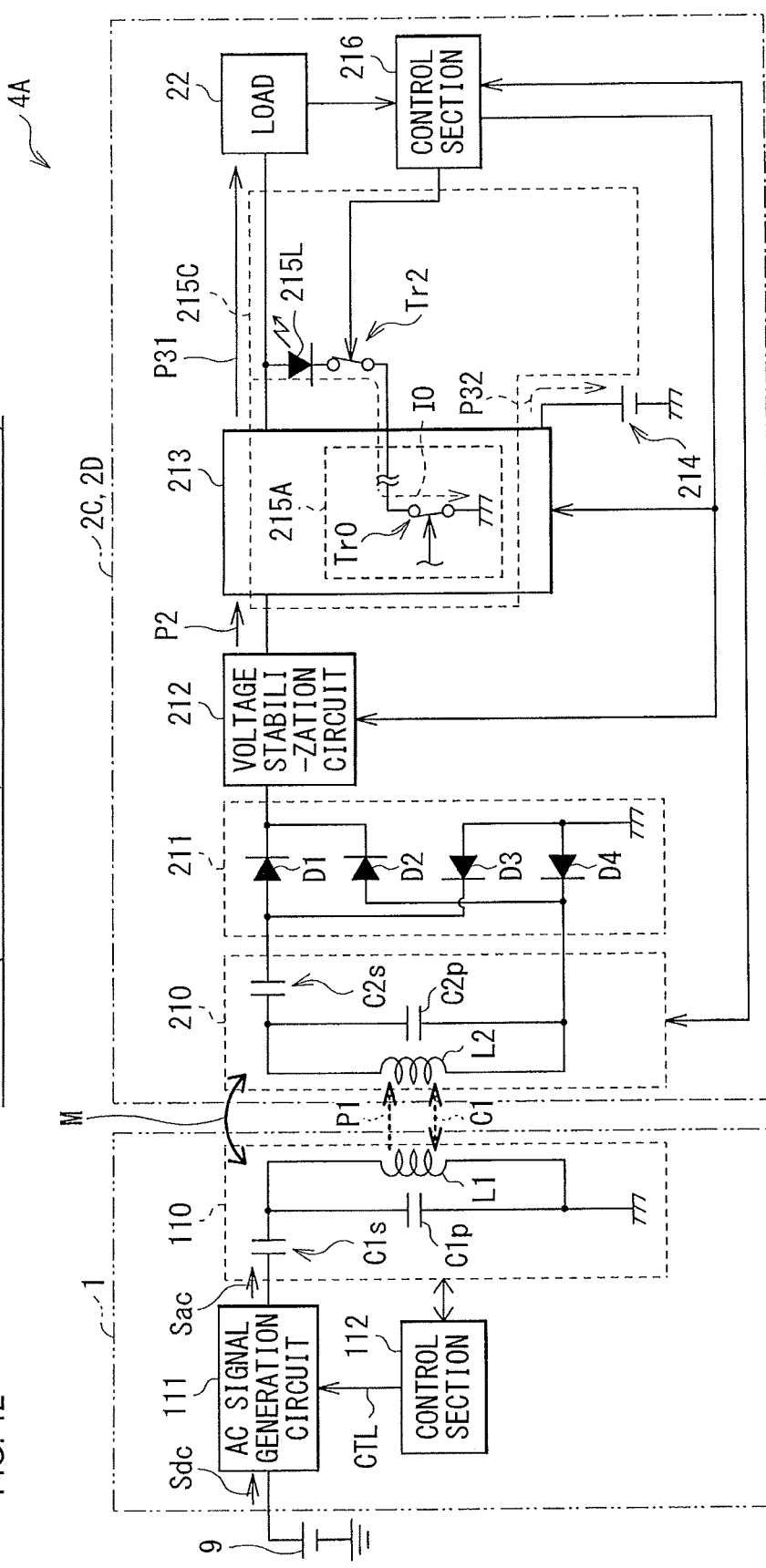
FIG. 12 is a circuit diagram illustrating an operation example during the charging period at the time of the normal operation according to Example 2.

First, at the time of the normal operation, for example, as with Example 2 illustrated in FIG. 12, the operation in charging is performed in the following manner. Specifically, first, the charging circuit 213 supplies the power P31 to the load 22 based on the power P2 supplied from the voltage stabilization circuit 212, as with the first embodiment. In addition, at the same time, the charging circuit 213 performs charging to the battery 214 with use of the surplus power (the power P32) that is obtained by subtracting the power (corresponding to the power P31) consumed by the load 22 from the power P2. Then, the lighting control section 215 detects the charging to the battery 214, and then sets the transistor Tr0 to the ON state. Moreover, when obtaining and detecting information indicating that the load 22 is not activated, from the load 22, the control section 216 sets the transistor Tr2 to the ON state. Accordingly, the current I0 flows through the light emitting element 215L, and thus the light emitting element 215L is put into the lighting state. As a result, the apparatus state indicating that the charging to the battery 214 is in process is informed to the outside.

Figure 13:
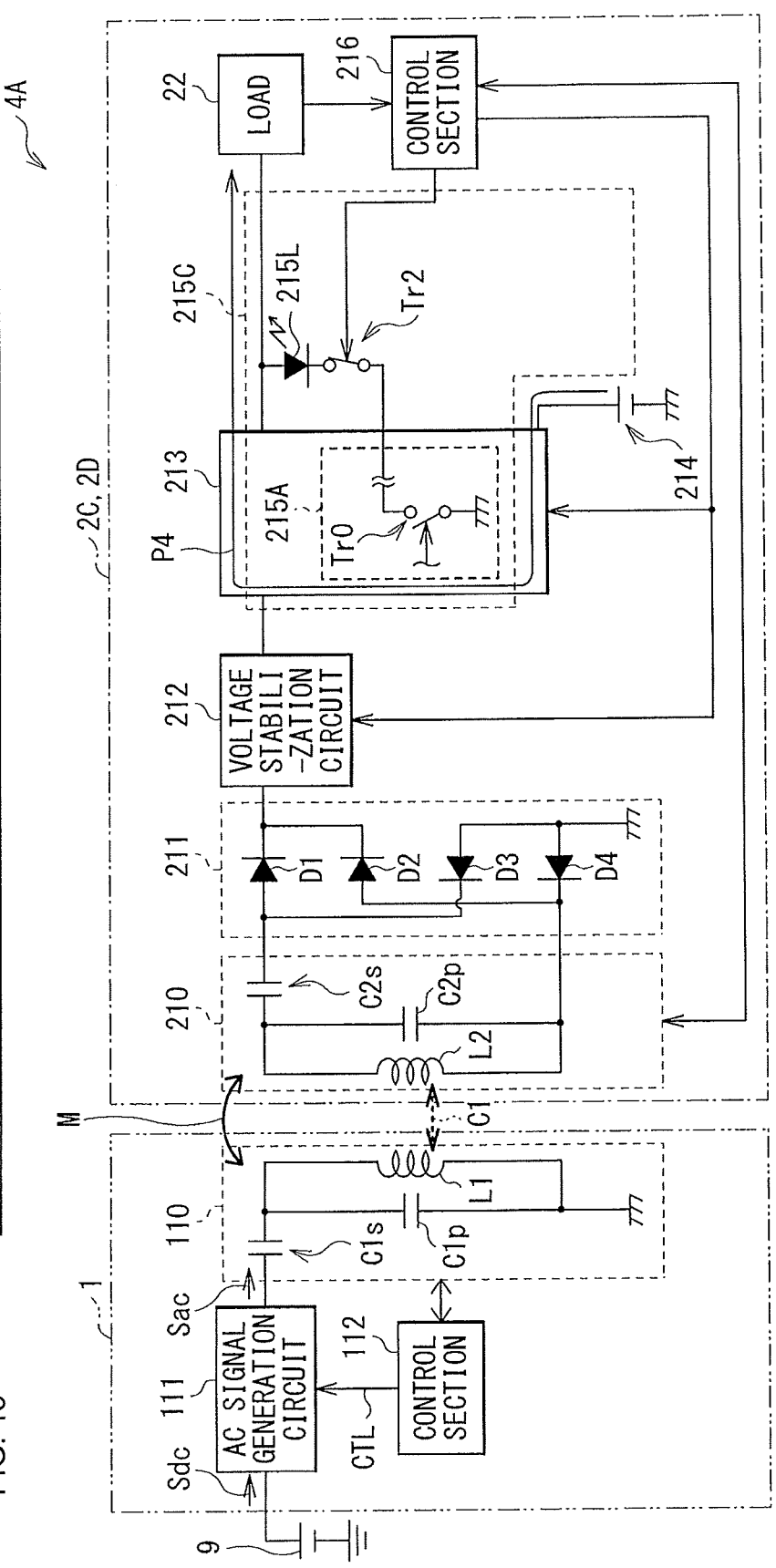
FIG. 13 is a circuit diagram illustrating an operation example after completion of the charging at the time of the normal operation according to the Example 2.

Further, for example, as with the Example 2 illustrated in FIG. 13, after completion of the charging at the time of the normal operation, the operation is performed in the following manner. Specifically, first, after the completion of the charging, as with the first embodiment, the power transmission from the feed unit 1 side to each of the electronic apparatuses 2A and 2B with use of the magnetic field is stopped, and thus the power P2 is not supplied to the charging circuit 213. Therefore, the power P31 is not supplied from the charging circuit 213 to the load 22, and the charging from the charging circuit 213 to the battery 214 with use of the power P32 (the surplus power) is also not performed. Moreover, likewise, the part (the power P4) of the charged power stored in the battery 214 is supplied to the load 22 through the charging circuit 213. Then, the lighting control section 215 detects the completion of the charging, and sets the transistor Tr0 to the OFF state. Therefore, as with the above-described charging, although the transistor Tr2 itself is set to the ON state by the control section 216, the current I0 does not flow through the light emitting element 215L because the transistor Tr0 is in the OFF state, and thus the light emitting element 215L is put into the lighting-off state. As a result, the apparatus state indicating that the charging to the battery 214 is completed is informed to the outside.

(During Activation of Load 22)

Figure 14:
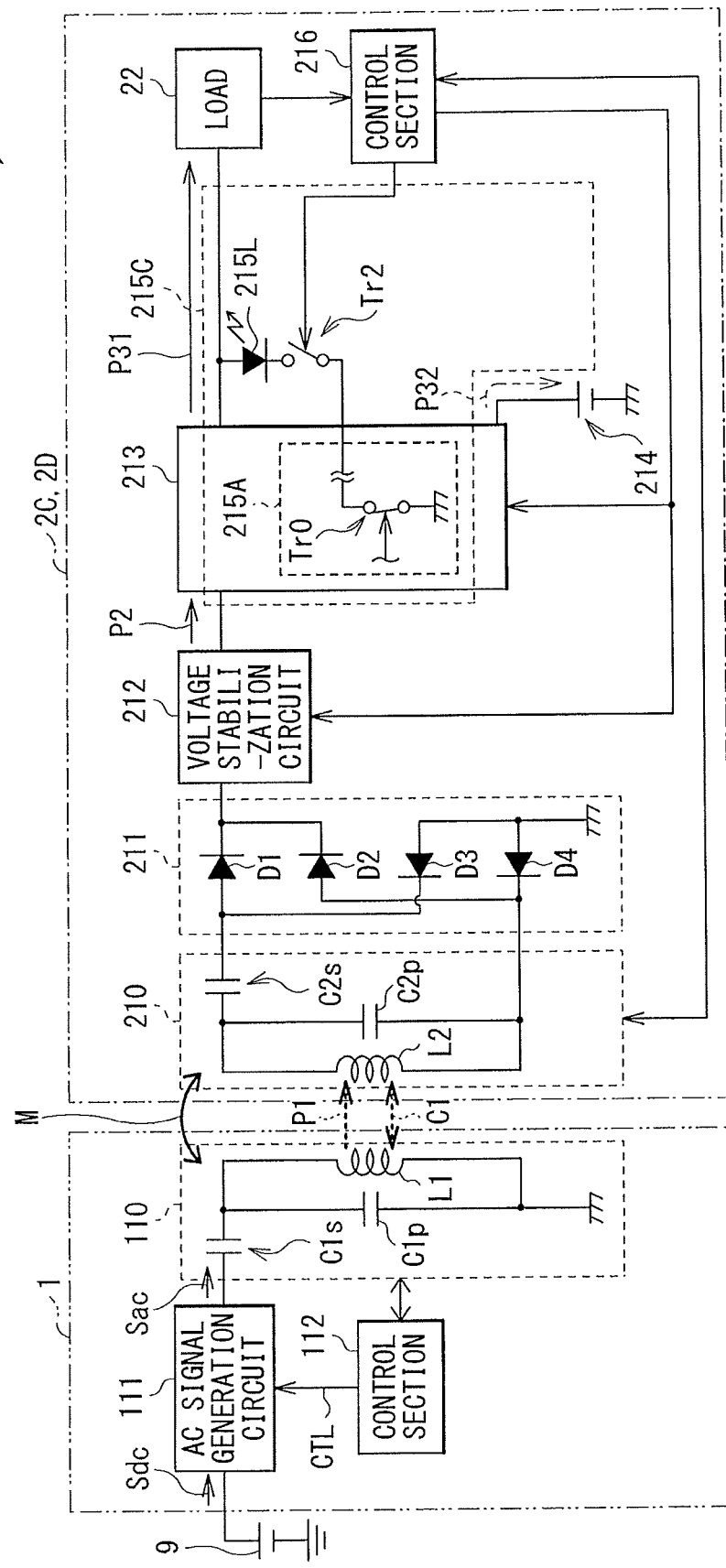
FIG. 14 is a circuit diagram illustrating an operation example during the charging period at the time of the activation according to the Example 2.

On the other hand, at the time of activation of the load 22 in charging, for example, as with the Example 2 illustrated in FIG. 14, the operation is performed in the following manner during the period during which the surplus power (the power P32) is generated. Specifically, first, the charging circuit 213 supplies the power P31 to the load 22 based on the power P2 supplied from the voltage stabilization circuit 212, similarly to in charging at the time of the normal operation described above. Moreover, at the same time, the charging circuit 213 performs charging to the battery 214 with use of the surplus power (the power P32) that is obtained by subtracting the power (corresponding to the power P31) consumed by the load 22 from the power P2. Then, the lighting control section 215A detects that the charging to the battery 214 is in process, and sets the transistor Tr0 to the ON state. Moreover, when obtaining and detecting information indicating that the load 22 is activated from the load 22, the control section 216 sets the transistor Tr2 to the OFF state as described above. Accordingly, the current I0 does not flow through the light emitting element 215L irrespective of the ON state of the transistor Tr0 itself, and the light emitting element 215L is put into the lighting-off state.

Figure 15:
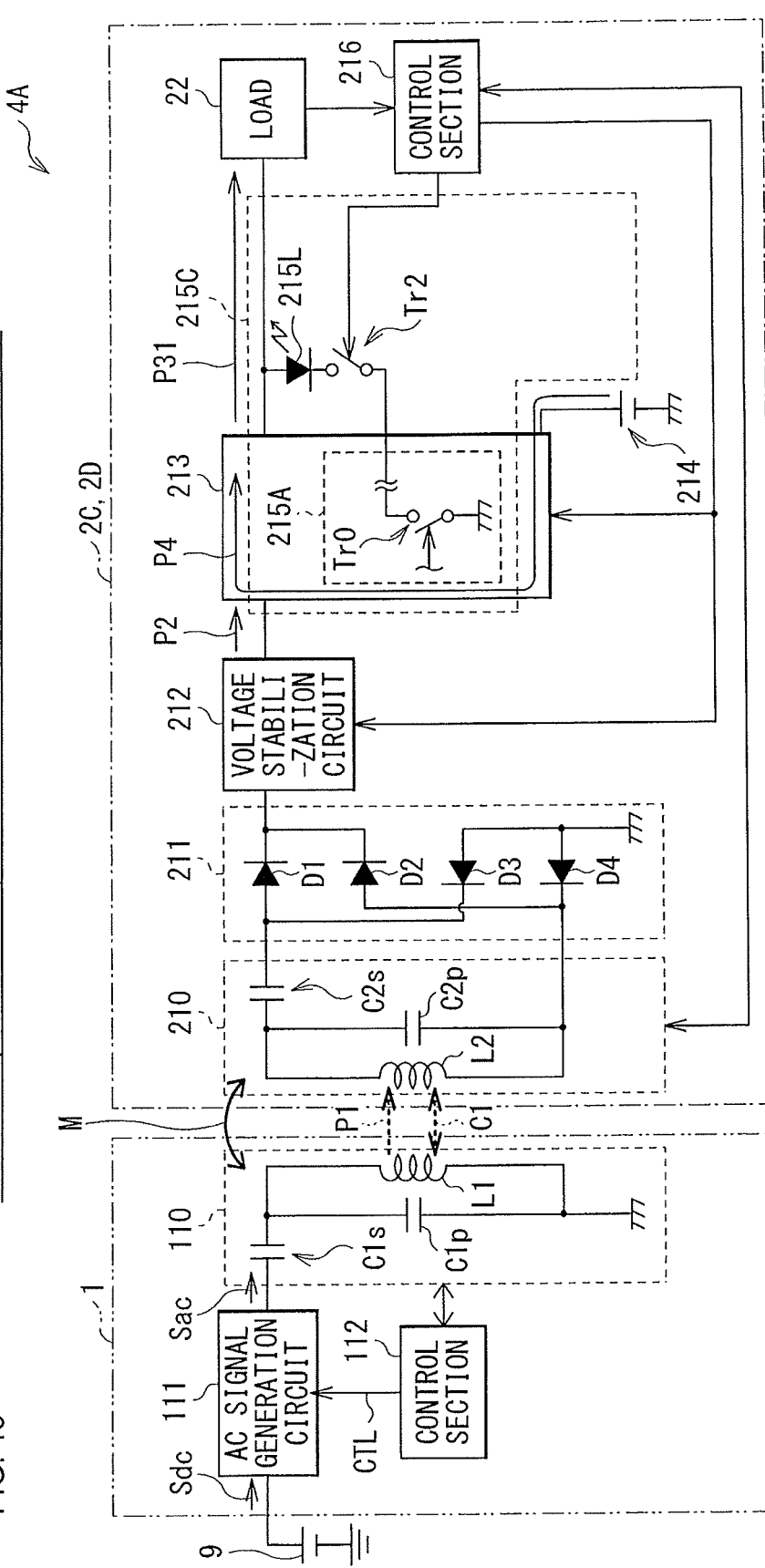
FIG. 15 is a circuit diagram illustrating another operation example during the charging period at the time of the activation according to the Example 2.

Moreover, for example, as with the Example 2 illustrated in FIG. 15, at the time of the activation of the load 22 in charging, the operation is performed in the following manner during the period during which the surplus power (the power P32) is not generated. Specifically, also in this case, first, the charging circuit 213 supplies the power P31 to the load 22 based on the power P2 supplied from the voltage stabilization circuit 212. However, since the surplus power (the power P32) is not generated in this case, the charging from the charging circuit 213 to the battery 214 with use of the power P32 (the surplus power) is not performed. Moreover, for the reason, as with after the completion of the charging at the time of the normal operation described above, the part (the power P4) of the charged power stored in the battery 214 is supplied as the part of the power P31 to the load 22 through the charging circuit 213. On the other hand, the lighting control section 215A detects that the charging to the battery 214 is not performed, and thus sets the transistor Tr0 to the OFF state. Moreover, also in this case, when obtaining and detecting the information indicating that the load 22 is activated from the load 22, the control section 216 sets the transistor Tr2 to the OFF state. Accordingly, the current I0 does not flow through the light emitting element 215L, and the light emitting element 215L is put into the lighting-off state also in this case.

As described above, similarly to the first embodiment, also in the present embodiment, occurrence of unnatural discontinuous state in the informing operation (intermittent informing operation) is avoided, and erroneous determination of the apparatus state by the user is prevented. Moreover, in the present embodiment, in contrast to the first embodiment, the light emitting element 215L is constantly in the lighting-off state irrespective of presence of occurrence of the surplus power during the charging period. Therefore, also in the present embodiment, usability of the user is allowed to be improved in the power transmission using the magnetic field.

Third Embodiment (Configuration of Feed System 4B)

Figure 16:
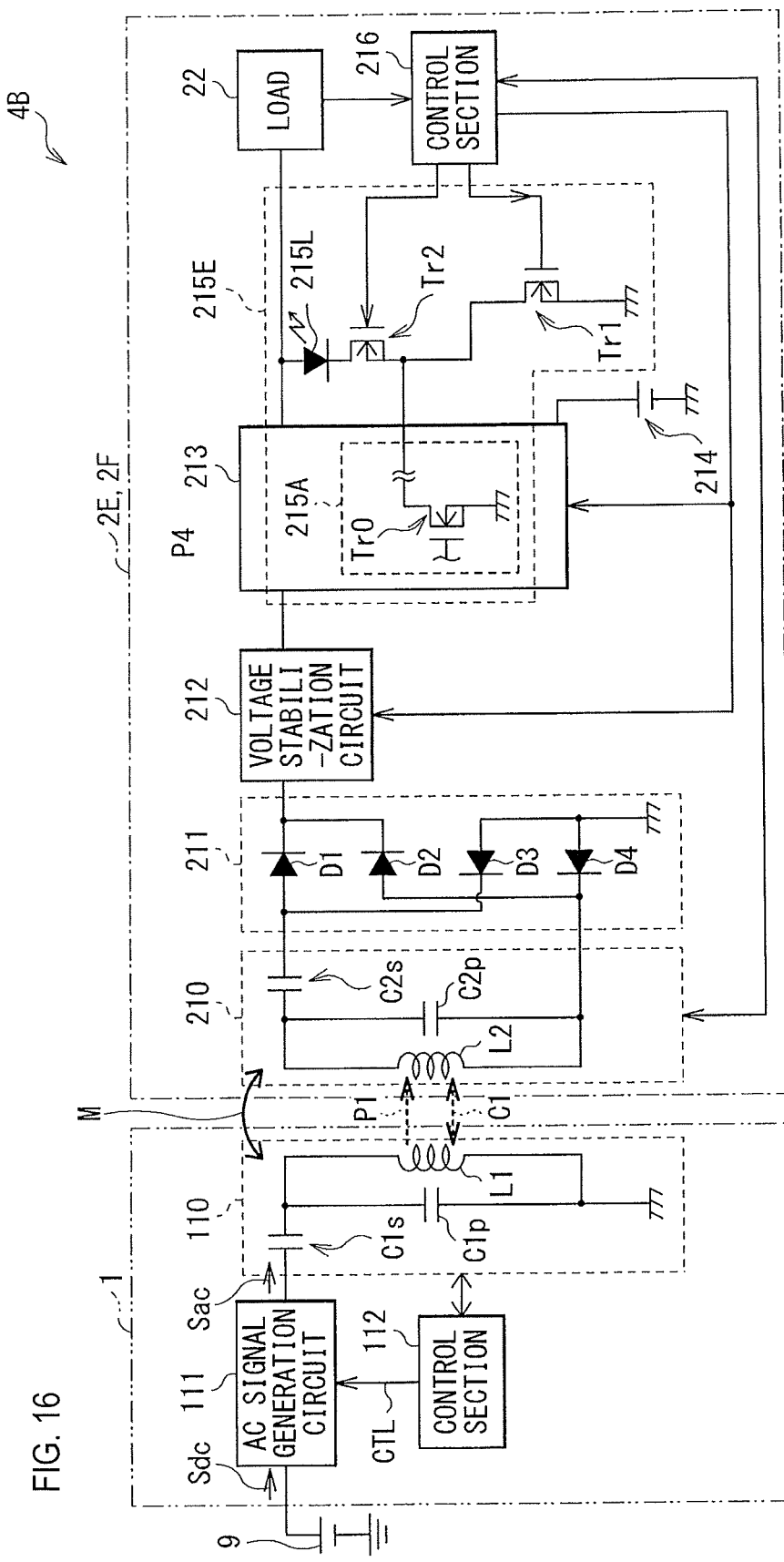
FIG. 16 is a circuit diagram illustrating a configuration example of a feed system according to a third embodiment.

FIG. 16 illustrates a configuration example of a feed system (a feed system 4B) according to a third embodiment by way of a block diagram and a circuit diagram. The feed system 4B is provided with electronic apparatuses 2E and 2F in place of the electronic apparatuses 2A and 2B as the units to be fed with power in the feed system 4 according to the first embodiment, and other configurations are similar to those in the feed system 4.

The electronic apparatuses 2E and 2F are each provided with a state informing section 215E described below in place of the state informing section 215 in the electronic apparatuses 2A and 2B, and other configurations are similar to those in the electronic apparatuses 2A and 2B.

(State Informing Section 215E)

The state informing section 215E includes the light emitting element 215L, the lighting control section 215A, and two (two kinds of) transistors Tr1 and Tr2 as switching devices. In other words, the state informing section 215E corresponds to a section provided with combination of both the transistor Tr1 in the state informing section 215 and the transistor Tr2 in the state informing section 215C, and other configurations are equivalent to those in the state informing section 215 and in the state informing section 215C.

Specifically, in the state informing section 215E, the gate of the transistor Tr2 receives the control signal from the control section 216, the source thereof is connected to the drain of each of the transistors Tr0 and Tr1, and the drain thereof is connected to the cathode of the light emitting element 215L. In addition, the gate of the transistor Tr1 also receives the control signal from the control section 216, and the source thereof is connected to the ground.

Further, in the present embodiment, when the load 22 is activated in charging, the control section 216 sets the ON-OFF state of one or both (both in this case) of the transistors Tr1 and Tr2, and forcibly sets the power path. Accordingly, as with the first and second embodiments, the lighting state of the light emitting element 215L is fixed also in the present embodiment.

(Function and Effects of Feed System 4B)

In the feed system 4B with such a configuration, in each of the electronic apparatuses 2E and 2F, the state informing operation is performed in a manner described below.

(During Normal Operation)

First, at the time of the normal operation, the state informing operation is performed both in charging and after completion of the charging, similarly to the first or second embodiment.

(During Activation of Load 22)

Figure 17:
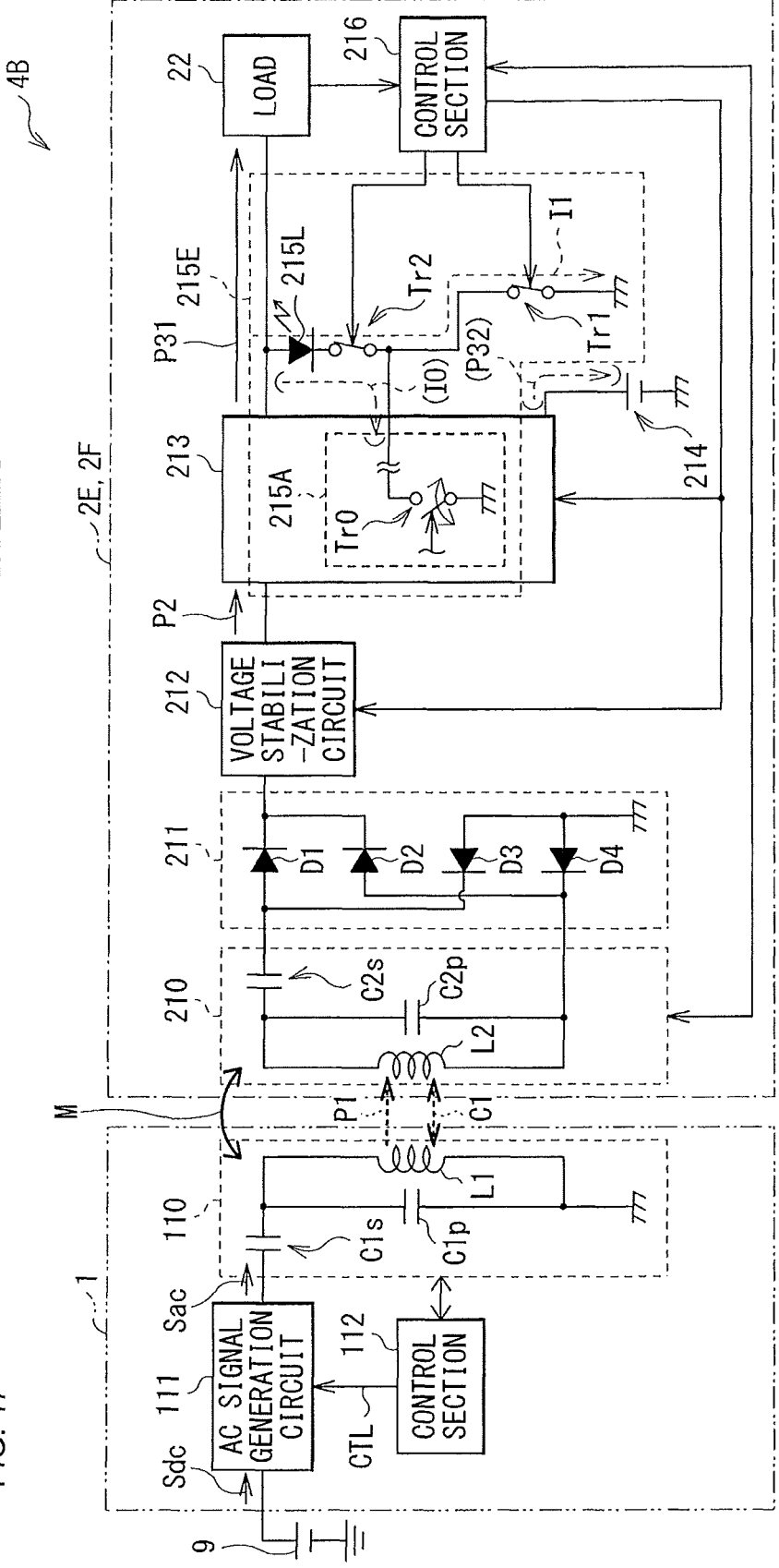
FIG. 17 is a circuit diagram illustrating an operation example during the charging period at the time of the activation according to Example 3-1.

On the other hand, at the time of the activation of the load 22, the state informing operation is performed in a manner of Example 3-1 illustrated in FIG. 17, for example. Specifically, as with the first embodiment, the control section 216 sets the transistor Tr1 to the ON state to forcibly put the power path (the path of the current I1) into the conductive state, thereby fixing the light emitting element 215L to the lighting state. In other words, the control section 216 controls the gate potential of the transistor Tr1 so that the transistor Tr1 is put into the ON state, and the current I1 is forcibly allowed to flow through the light emitting element 215L. Note that, in the example in this case, the control section 216 performs the control so that the transistor Tr2 is put into the ON state even at the time of the activation of the load 22.

Figure 18:
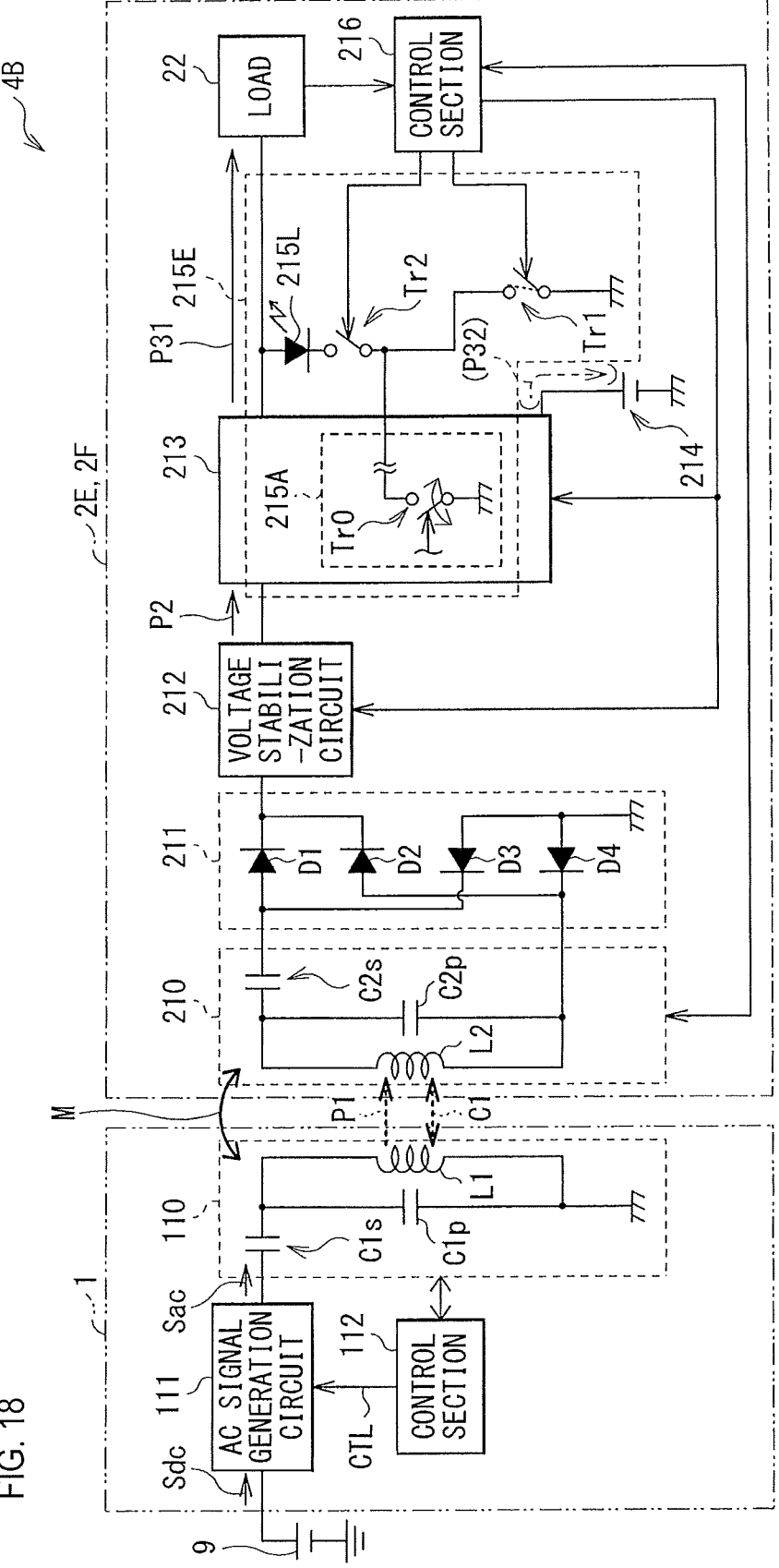
FIG. 18 is a circuit diagram illustrating an operation example during the charging period at the time of the activation according to Example 3-2.

Alternatively, the state informing operation is performed in a manner of Example 3-2 illustrated in FIG. 18, for example. Specifically, as with the second embodiment, the transistor Tr2 is set to the OFF state to forcibly put the power path (the path of the current I0) into the blocked state, and thus the light emitting element 215L is fixed to the lighting-off state. In other words, the control section 216 controls the gate potential of the transistor Tr2 so that the transistor Tr2 is put into the OFF state and the current I0 is forcibly allowed not to flow through the light emitting element 215L.

In this way, also in the present embodiment, as with the first and second embodiments, occurrence of unnatural discontinuous state in the informing operation (intermittent informing operation) is avoided, and erroneous determination of the apparatus state by the user is prevented. Therefore, also in the present embodiment, it is possible to improve usability of the user in the power transmission using the magnetic field.

Moreover, in the present embodiment, when the load 22 is activated in charging, the control section 216 may fix the lighting state of the light emitting element 215L according to the supply state of the received power (corresponding to the above-described power P2) and the consumption state of the power P31 by the load 22.

More specifically, when the occurrence period of the surplus power (the power P32) is relatively high rate (high frequency), the control section 216 forcibly puts the power path (the path of the current I1) into the conductive state to fix the light emitting element 215L to the lighting state, as with the Example 3-1 illustrated in FIG. 17. In other words, since the charging period to the battery 214 is relatively long in a state where the surplus power is easily generated, the control section 216 fixes the light emitting element 215L to the lighting state to positively inform the fact that the charging is in process.

On the other hand, when the occurrence period of the surplus power is relatively low rate (low frequency), the control section 216 forcibly puts the power path (the path of the current I0) into the blocked state to fix the light emitting element 215L to the lighting-off state. In other words, since the charging period to the battery 214 is relatively short in a state where the surplus power is difficult to be generated, the control section 216 fixes the light emitting element 215L to the lighting-off state to positively inform the fact that the charging is not in process.

As described above, when the lighting state of the light emitting element 215L is fixed according to the supply state of the received power and the power consumption state in the load 22, range of options to fix the lighting state is expanded, and thus the state informing operation is allowed to be controlled more positively according to the state of the feed system.

Modification

Subsequently, a modification common to the first to third embodiments described above will be described. Note that like numerals are used to designate substantially like components of the first to third embodiments, and the description thereof is appropriately omitted.

Figure 19:
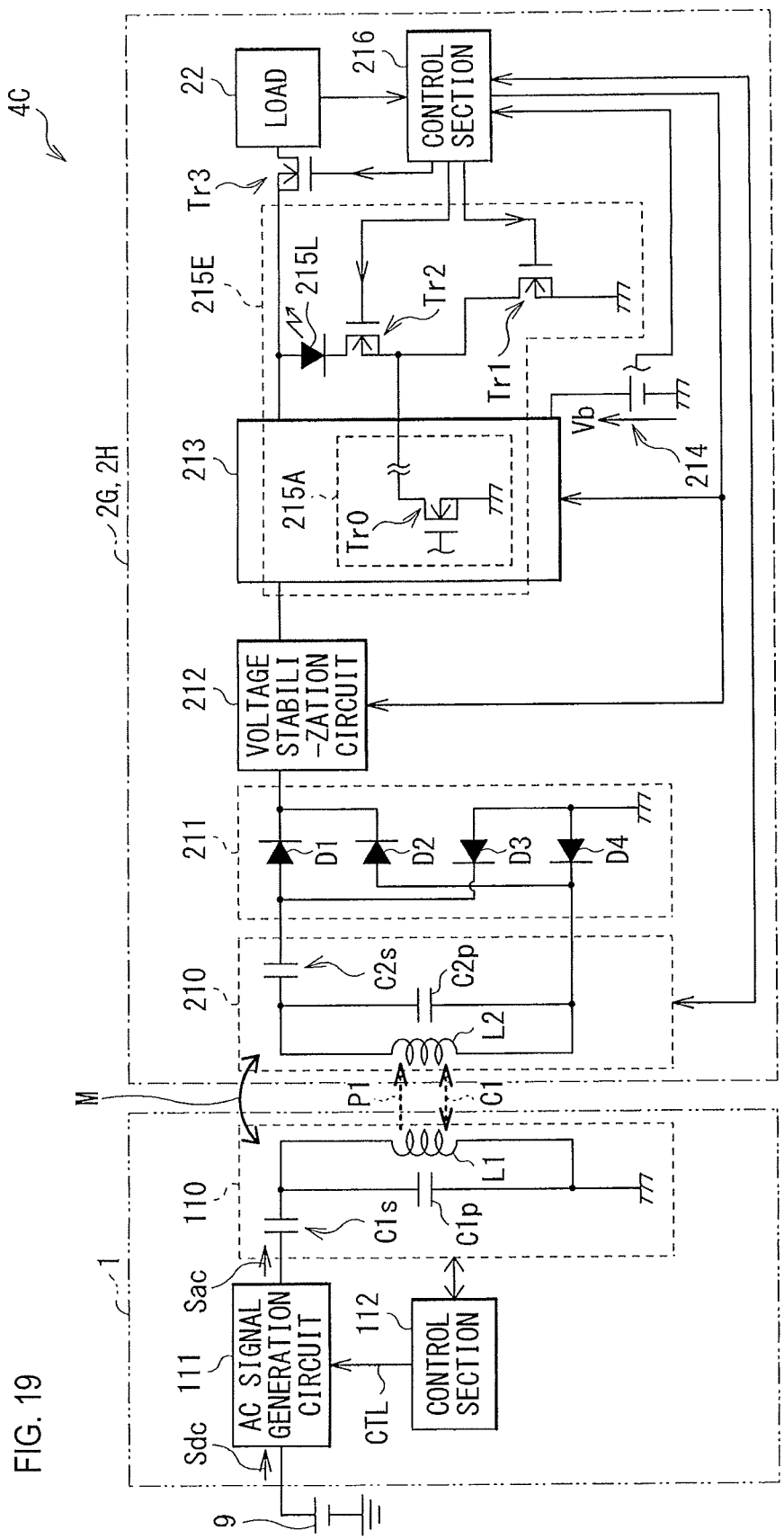
FIG. 19 is a circuit diagram illustrating a configuration example of a feed system according to a modification.

FIG. 19 illustrates a configuration example of a feed system (a feed system 4C) according to the modification by way of a block diagram and a circuit diagram. The feed system 4C is provided with electronic apparatuses 2G and 2H in place of the electronic apparatuses 2E and 2F as the units to be fed with power in the feed system 4B of the third embodiment, and other configurations thereof are similar to those in the feed system 4B.

The electronic apparatuses 2G and 2H respectively correspond to the electronic apparatuses 2E and 2F each further provided with a transistor Tr3 (a third switching device) on the connection line (on the power supply path to the load 22) between the state informing section 215E and the load 22 (between the charging circuit 213 and the load 22), and other configurations thereof are similar to those of the electronic apparatuses 2D and 2F.

The transistor Tr3 is configured of a p-type FET in this case, and the gate thereof receives the control signal from the control section 216, the source thereof is connected to the output terminal of the charging circuit 213 and the anode of the light emitting element 215L, and the drain thereof is connected to the input terminal of the load 22.

Further, in the present modification, when the load 22 is activated in charging to the battery 214, the control section 216 sets the transistor Tr3 to the OFF state to forcibly puts the power supply path from the charging circuit 213 to the load 22, into the blocked state. In other words, when the load 22 is activated in charging, the control section 216 performs control so that the power supply to the load 22 (supply of the above-described power P31) is not performed.

Figure 20:
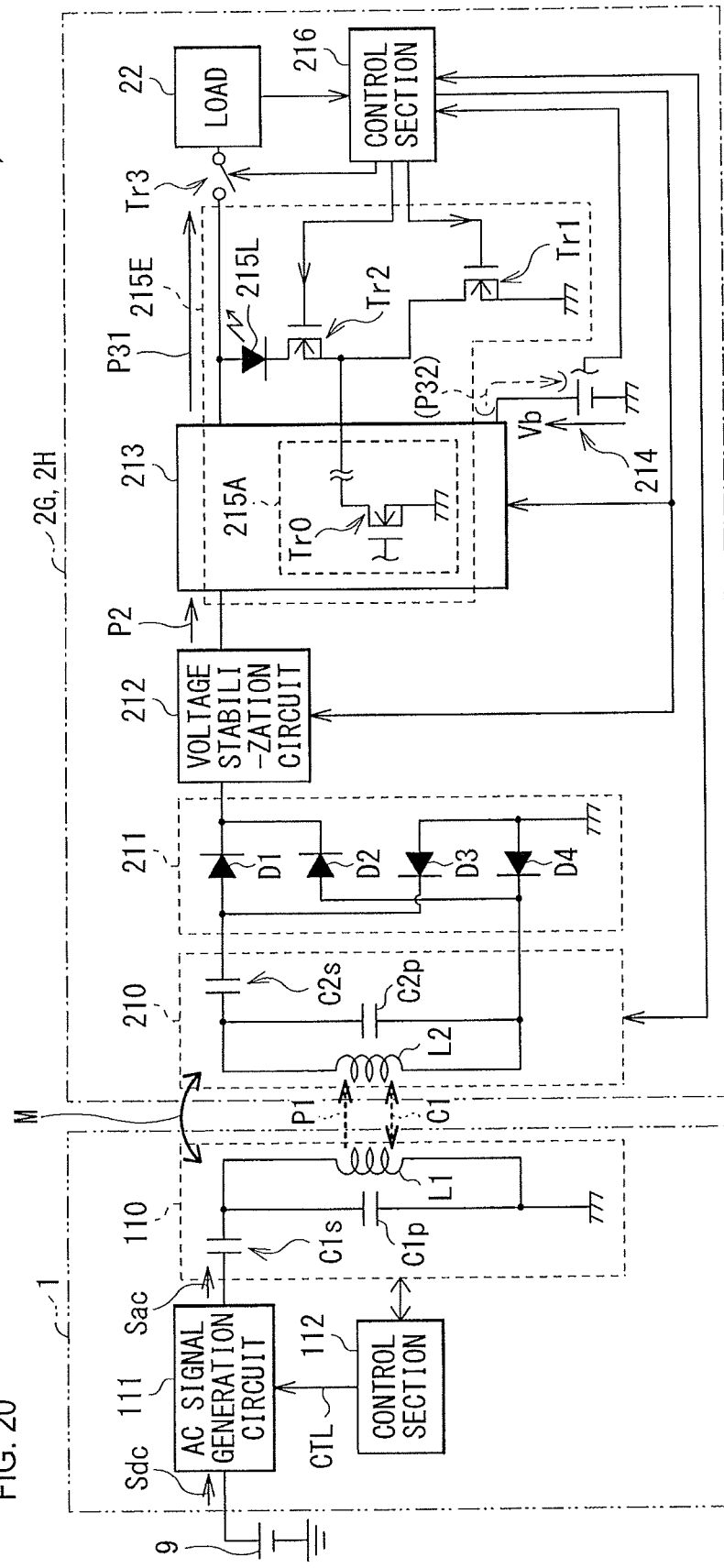
FIG. 20 is a circuit diagram illustrating an operation example during the charging period at the time of the activation according to Example 4.

More specifically, as with Example 4 illustrated in FIG. 20, for example, in the case where the load 22 is activated in charging, the control section 216 sets the transistor Tr3 to the OFF state when the charging amount in the battery 214 is lower than a predetermined threshold. In this example, such control is performed when a battery voltage Vb illustrated in the figure is lower than a predetermined threshold voltage Vth (Vb<Vth).

Therefore, in the present modification, forcible stoppage of the load 22 and the like due to shortage of the power supplied to the load 22 caused by the activation of the load 22 in charging to the battery 214 is avoided. Specifically, first, in the wired feed system, typically, a protection circuit that prevents the load 22 from being activated when the charged amount of the secondary battery is insufficient is provided. However, in the protection circuit dedicated to the wired system, it is conceivable that the operation is stopped in charging since it is hard to assume the shortage of the charged amount in charging to a secondary battery. However, in the non-contact feed system, since the power transmission efficiency is inferior to that of the wired system as described above, the part of the charged power in the secondary battery is supplied to the load at the time of activation of the load even in charging. In other words, in the non-contact feed system, shortage of the charged amount in the secondary battery may occur at the time of activation of the load even in charging, and in this case, the system (the load 22) may be forcibly stopped.

Therefore, in the present modification, as described above, when the load 22 is activated in charging to the battery 214, the transistor Tr3 is set to the OFF state, and thus the power supply path from the charging circuit 213 to the load 22 is forcibly put into the blocked state. As a result, the above-described forcible stoppage of the load 22 and the like due to shortage of the power supplied to the load 22 is allowed to be avoided. Therefore, also in the present modification, it is possible to improve usability of the user in the power transmission using the magnetic field.

Figure 21:
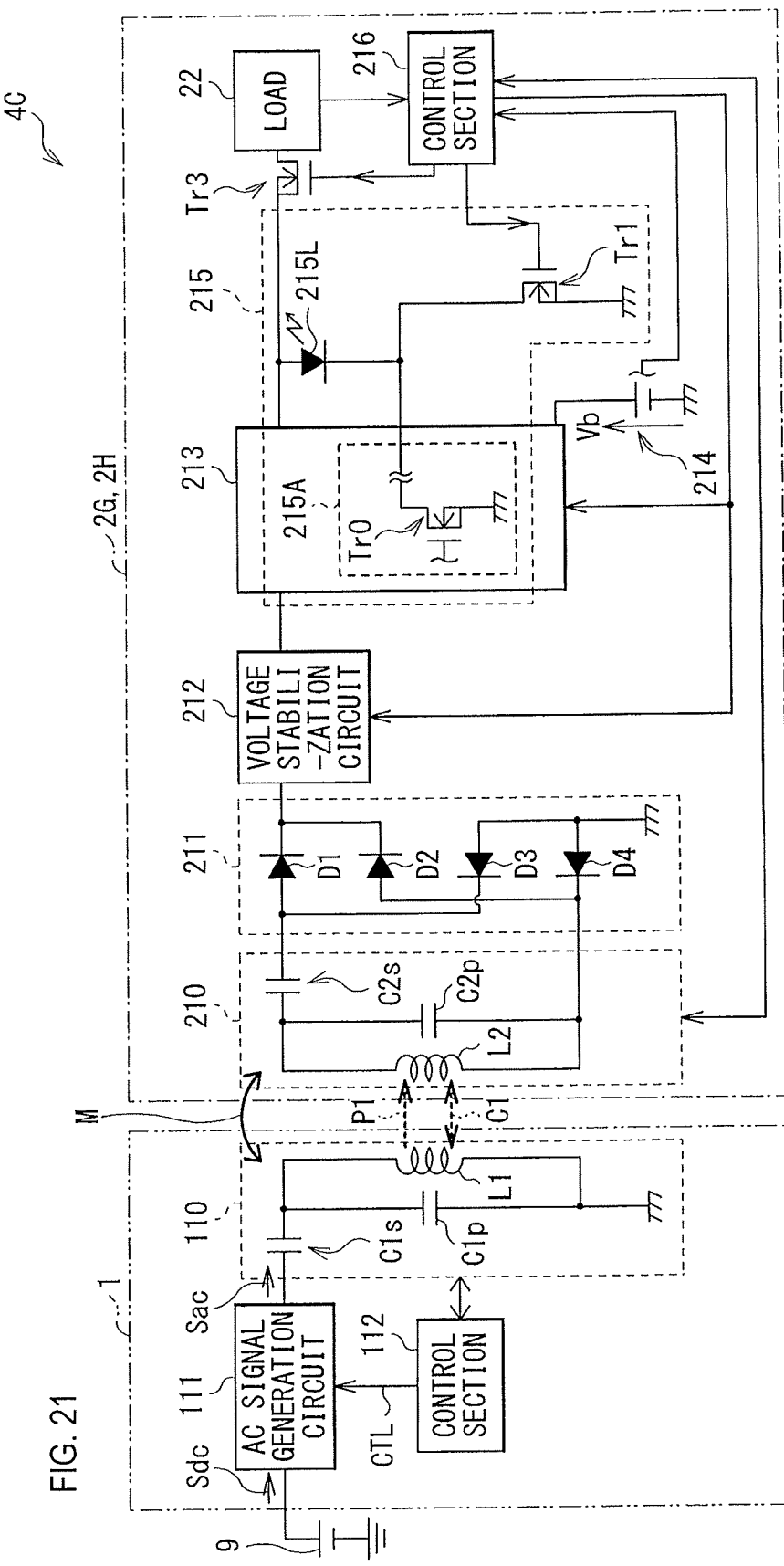
FIG. 21 is a circuit diagram illustrating another configuration example of the feed system according to the modification.
Figure 22:
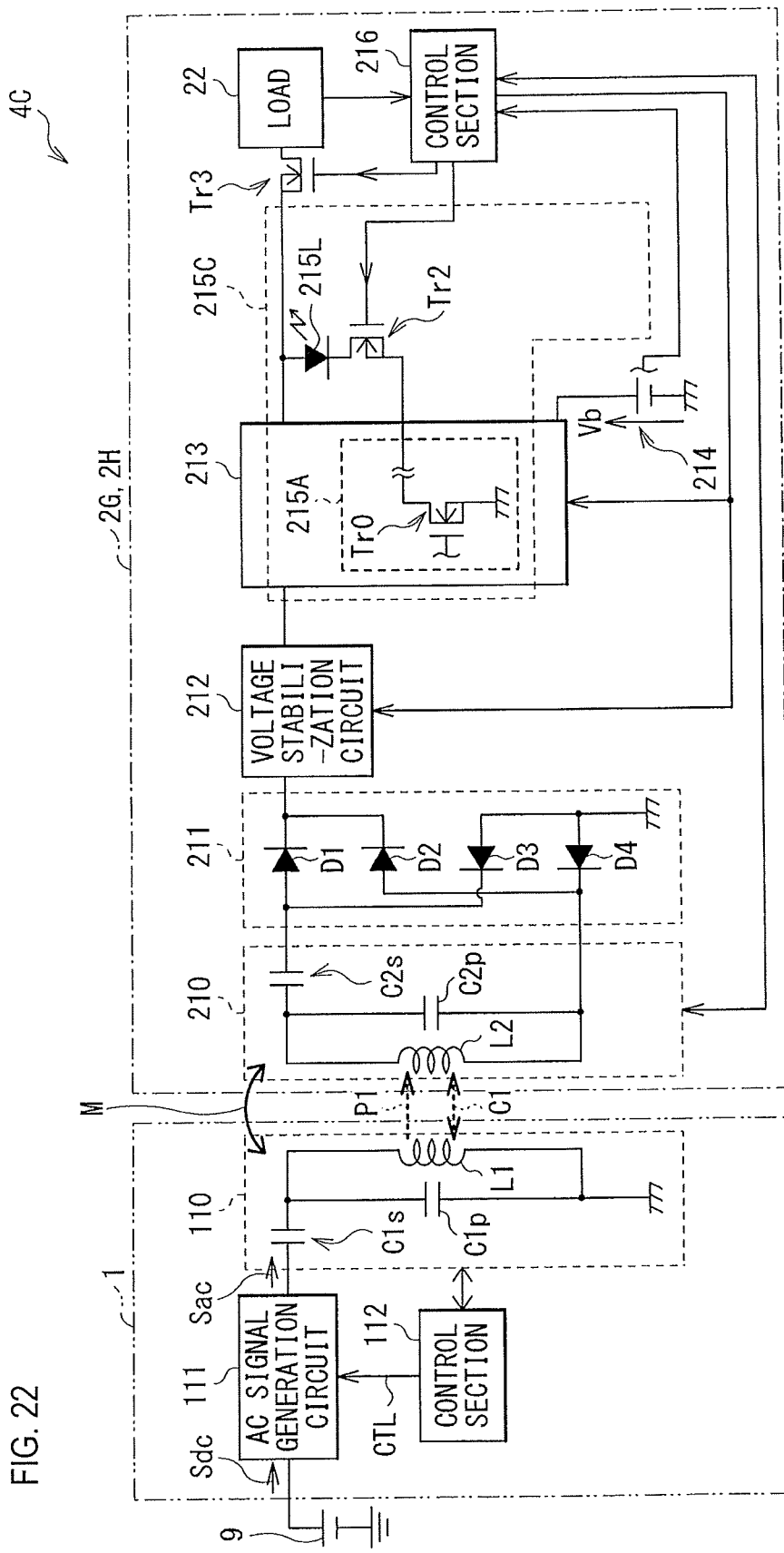
FIG. 22 is a circuit diagram illustrating still another configuration example of the feed system according to the modification.

Note that, in the present modification, the configuration in which each of the electronic apparatuses 2E and 2F described in the third embodiment further has the transistor Tr3 on the power supply path to the load 22 has been described as an example, however, the configuration is not limited thereto, and for example, configurations illustrated in FIG. 21 and FIG. 22 may be employed. Specifically, for example, as illustrated in FIG. 21, the configuration in which each of the electronic apparatuses 2A and 2B described in the first embodiment further has the transistor Tr3 on the power supply path to the load 22 may be employed. Moreover, for example, as illustrated in FIG. 22, the configuration in which each of the electronic apparatuses 2C and 2D described in the second embodiment further has the transistor Tr3 on the power supply path to the load 22 may be employed.

Other Modifications

Hereinbefore, although the technology of the present disclosure has been described with referring to the embodiments and the modification, the technology is not limited to the embodiments and the like, and various modifications may be made.

For example, in the above-described embodiments and the like, various kinds of coils (the power transmission coil and the power reception coil) have been described. However, various kinds of configurations are allowed to be used as the configurations (shapes) of the respective coils. Specifically, for example, each coil may be configured in shapes such as a spiral shape, a loop shape, a bar shape using a magnetic body, an alpha-wound shape configured by folding a spiral coil into two layers, a multilayer spiral shape, and a helical shape configured by winding a wire in a thickness direction thereof. Moreover, each coil is not limited to a winding coil configured of a conductive wire rod, and may be a conductive patterned coil configured of a printed board, a flexible printed board, or the like.

In addition, in the above-described embodiments and the like, although the electronic apparatus has been described as an example of a unit to be fed with power, the unit to be fed with power is not limited thereto, and may be other than the electronic apparatus (for example, vehicles such as electric cars).

Furthermore, in the above-described embodiments and the like, the components of each of the feed unit and the electronic apparatuses have been specifically described. However, all of the components are not necessarily provided, and other components may be further provided. For example, in the feed unit or in the electronic apparatus, a communication function, a control function, a display function, a function of authenticating a secondary-side unit, a function of determining whether a secondary-side unit is placed on a primary-side unit, a function of detecting mixture of a dissimilar metal and the like, etc. may be provided.

Moreover, in the above-described embodiments and the like, mainly, the case where the feed system includes a plurality of (two) electronic apparatuses has been described as an example. However, the number of electronic apparatuses is not limited thereto, and the feed system may include only one electronic apparatus.

Furthermore, in the above-described embodiments and the like, the charging tray for a small electronic apparatus (CE device) such as a mobile phone has been described as an example of the feed unit. However, the feed unit is not limited to such a household charging tray, and is applicable as a charging unit for various electronic apparatuses, and the like. In addition, the feed unit is not necessarily a tray, and for example, may be a stand for electronic apparatuses such as a so-called cradle.

(Example of Feed System Performing Non-Contact Power Transmission Using Electric Field)

Moreover, in the above-described embodiments and the like, the case of the feed system that performs non-contact power transmission (feeding) using a magnetic field from a feed unit as a primary-side unit to an electronic apparatus as a secondary-side unit has been described as an example; however this is not limitative. In other words, the contents of the present disclosure is applicable to a feed system that performs non-contact power transmission using an electric field (electric field coupling) from a feed unit as a primary-side unit to an electronic apparatus as a secondary-side unit, and effects similar to those in the above-described embodiments and the like may be obtained.

Figure 23:
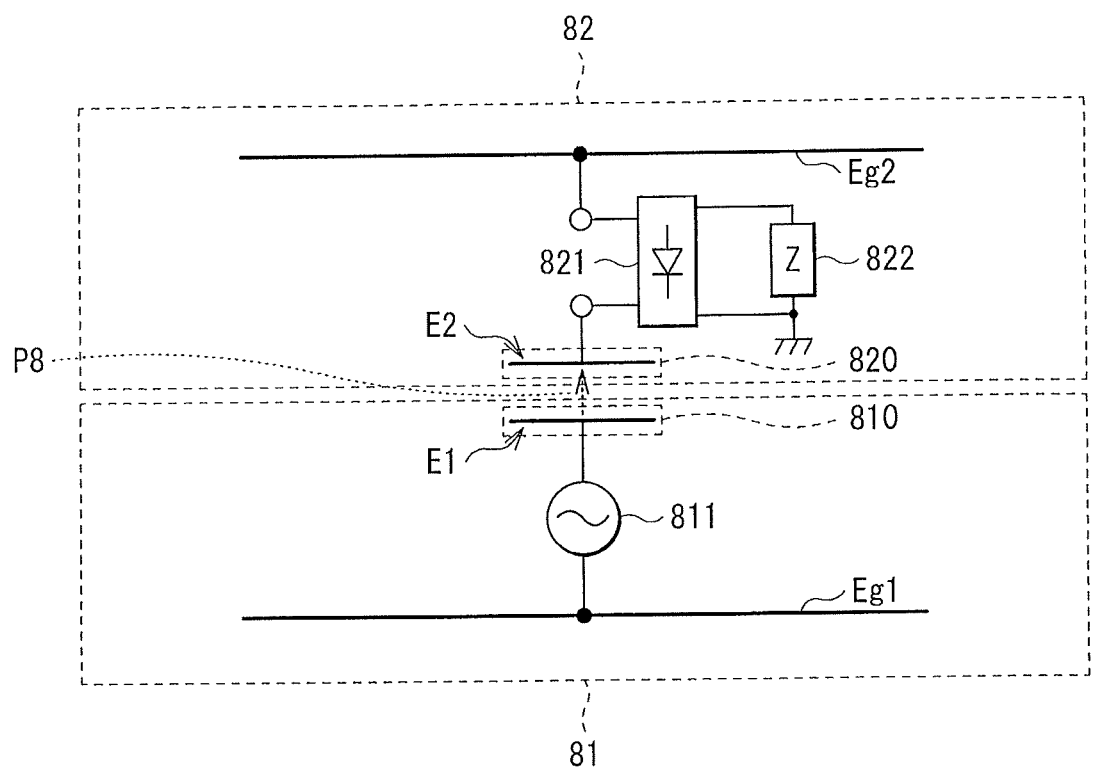
FIG. 23 is a block diagram illustrating a schematic configuration example of a feed system according to another modification.

Specifically, for example, a feed system illustrated in FIG. 23 may include one feed unit 81 (a primary-side unit) and one electronic apparatus 82 (a secondary-side unit). The feed unit 81 mainly has a power transmission section 810 including a power transmission electrode E1 (a primary-side electrode), an AC signal source 811 (an oscillator), and a ground electrode Eg1. The electronic apparatus 82 mainly has a power reception section 820 including a power reception electrode E2 (a secondary-side electrode), a rectification circuit 821, a load 822, and a ground electrode Eg2. More specifically, the feed system includes two pairs of electrodes, the power transmission electrode E1 and the power reception electrode E2, and the ground electrodes Eg1 and Eg2. In other words, each of the feed unit 81 (the primary-side unit) and the electronic apparatus 82 (the secondary-side unit) has an antenna configured of a pair of asymmetric electrode structures, such as a monopole antenna therein.

Figure 24:
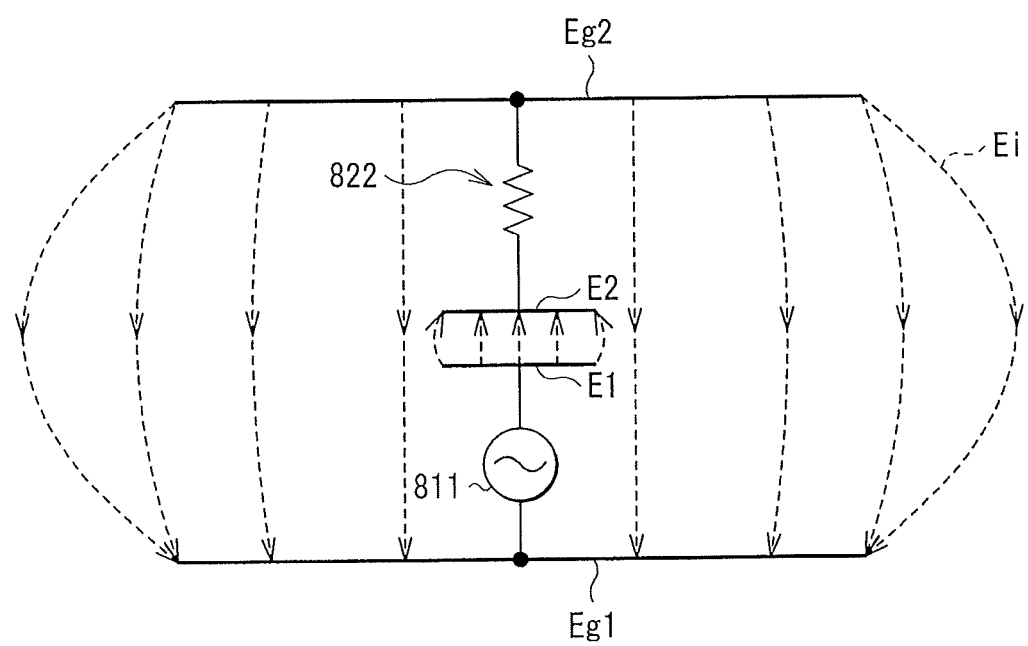
FIG. 24 is a schematic diagram illustrating an example of propagation mode of an electric field in the feed system illustrated in FIG. 23.

In the feed system having such a configuration, when the power transmission electrode E1 and the power reception electrode E2 face each other, the above-described non-contact antennae are coupled with each other (are coupled with each other by an electric field along a perpendicular direction of the electrodes). Then, the induction field is generated therebetween, and power transmission using the electronic field is accordingly performed (see power P8 illustrated in FIG. 23). More specifically, for example, as schematically illustrated in FIG. 24, the generated electric field (induction field Ei) propagates from the power transmission electrode E1 side to the power reception electrode E2 side, as well as the generated induction field Ei propagates from the ground electrode Eg2 side to the ground electrode Eg1 side. In other words, a loop path of the generated induction field Ei is formed between the primary-side unit and the secondary-side unit. Also in such a non-contact power supply system using the electronic field, similar effects are allowed to be obtained by applying similar method to that in the above-described embodiments.

Note that the present technology may be configured as follows.

(1) An electronic apparatus including:
a power reception section configured to receive power transmitted with use of a magnetic field or an electric field;
a secondary battery;
a charging section configured to perform charging to the secondary battery, based on received power received by the power reception section;
a load configured to perform predetermined operation, based on supplied power; and
a control section configured to forcibly set a power path on a preceding side of the load to a predetermined state when the load is activated in the charging to the secondary battery.

(2) The electronic apparatus according to (1), further including a state informing section configured to inform outside of an apparatus state of itself, wherein
the control section forcibly sets the power path to forcibly fix an informing mode by the state informing section when the load is activated in the charging.

(3) The electronic apparatus according to (2), wherein the state informing section informs a state in charging to the secondary battery and a state after completion of the charging as the apparatus state by a distinguished informing mode.

(4) The electronic apparatus according to (3), wherein
the state informing section includes a lighting section configured to inform a state in the charging and a state after completion of the charting, according to a lighting state, and a lighting control section configured to control the lighting state of the lighting section, and
the control section performs control to allow the lighting state of the lighting section to be fixed irrespective of lighting control by the lighting control section when the load is activated in the charging.

(5) The electronic apparatus according to (4), wherein the state informing section includes one or a plurality of kinds of switching devices, and the control section sets ON-OFF state of one or more kinds of the one or the plurality of kinds of switching devices and forcibly sets the power path, to fix the lighting state of the lighting section when the load is activated in the charging.

(6) The electronic apparatus according to (5), wherein
the state informing section includes a first switching device as the one or the plurality of kinds of switching devices, and
the control section sets the first switching device to an ON state and forcibly puts the power path into a conductive state, to fix the lighting section to a lighting state when the load is activated in the charging.

(7) The electronic apparatus according to (5), wherein
the state informing section includes a second switching device as the one or the plurality of kinds of switching devices, and
the control section sets the second switching device to OFF state, and forcibly puts the power path into a blocked state, to fix the lighting section to a lighting-off state when the load is activated in the charging.

(8) The electronic apparatus according to any one of (4) to (7), wherein the control section fixes the lighting state of the lighting section according to supply state of the received power and power consumption state of the load when the load is activated in the charging.

(9) The electronic apparatus according to (8), wherein when a generation period of surplus power is relatively high rate, the control section forcibly puts the power path into the conductive state to fix the lighting section to the lighting state, and when the generation period of the surplus power is relatively low rate, the control section forcibly puts the power path into the blocked state to fix the lighting section to the lighting-off state, the surplus power being obtained by subtracting power consumed by the load from the received power, and the surplus power being used in charging to the secondary battery.

(10) The electronic apparatus according to any one of (1) to (9), further including
a third switching device provided on a power supply path to the load, wherein
the control section sets the third switching device to OFF state to forcibly put the power supply path to the load as the power path, into a blocked state when the load is activated in the charging.

(11) The electronic apparatus according to (10), wherein when the load is activated in the charging and when a charged amount in the secondary battery is lower than a predetermined threshold, the control section sets the third switching device to the OFF state.

(12) A feed system provided with one or a plurality of electronic apparatuses and a feed unit configured to transmit power to the electronic apparatuses with use of a magnetic field or an electric field, the electronic apparatuses each including:
a power reception section configured to receive power transmitted from the feed unit;
a secondary battery;
a charging section configured to perform charging to the secondary battery, based on received power received by the power reception section;
a load configured to perform predetermined operation, based on supplied power; and
a control section configured to forcibly set a power path on a preceding side of the load to a predetermined state when the load is activated in the charging to the secondary battery.

It should be understood by those skilled in the art that various modifications, combinations, sub-combinations, and alterations may occur depending on design requirements and other factors insofar as they are within the scope of the appended claims or the equivalents thereof.

The invention claimed is:

1. An electronic apparatus comprising:
   power reception circuitry configured to receive power transmitted via a magnetic field or an electric field;
   a battery;
   charging circuitry configured to perform charging to the battery based on the power received by the power reception circuitry;
   a state informing section configured to inform outside of an apparatus state of itself, the state informing section including a light emitting element;
   a load configured to perform a predetermined operation;
   control circuitry configured to:
      control the charging circuitry and the load;
      detect whether the load is activated or not in the charging to the battery; and
      in a case that it is detected that the load is activated in the charging to the battery, forcibly fix an informing mode by the state informing section to a mode of informing outside of the apparatus state irrespective of presence of a surplus power, the surplus power being obtained by subtracting a power consumed by the load from the power received by the power reception circuitry,
   wherein the light emitting element is connected to the load and connected to a first switching element provided on a power supply path, and
   wherein the first switching element is configured to be set to an OFF state in the case that it is detected that the load is activated in the charging to the battery.

2. The electronic apparatus according to claim 1, wherein a source of the first switching element is connected to an input side of the light emitting element and a drain of the first switching device is connected to the load.

3. The electronic apparatus according to claim 2, wherein the source of the first switching element is further connected to an output terminal of the charging circuitry.

4. The electronic apparatus according to claim 1, wherein the state information section is forcibly set to the mode of informing outside of the apparatus state both when the surplus power is present because the power received by the power reception circuitry is larger than the power consumed by the load, and when the surplus power is not present because the power consumed by the load is larger than the power received by the power reception circuitry.

5. The electronic apparatus according to claim 1, wherein the control circuitry forcibly fixes the informing mode by forcibly setting a power path.

6. The electronic apparatus according to claim 5, wherein the state informing section informs a state in charging to the battery and a state after completion of the charging as the apparatus state by a distinguished informing mode.

7. The electronic apparatus according to claim 6, wherein
   the state informing section includes a lighting section configured to inform a state in the charging and a state after completion of the charging, according to a lighting state, and lighting control circuitry configured to control the lighting state of the lighting section, and
   the control circuitry performs control to allow the lighting state of the lighting section to be fixed irrespective of lighting control by the lighting control circuitry when the load is activated in the charging.

8. The electronic apparatus according to claim 7, wherein
   the state informing section includes one or a plurality of kinds of switching devices, and
   the control circuitry sets ON-OFF state of one or more kinds of the one or the plurality of kinds of switching devices and forcibly sets the power path, to fix the lighting state of the lighting section when the load is activated in the charging.

9. The electronic apparatus according to claim 8, wherein
   the state informing section includes a second switching device as the one or the plurality of kinds of switching devices, and
   the control circuitry sets the second switching device to an ON state and forcibly puts the power path into a conductive state, to fix the lighting section to a lighting state when the load is activated in the charging.

10. The electronic apparatus according to claim 8, wherein
    the state informing section includes a second switching device as the one or the plurality of kinds of switching devices, and
    the control circuitry sets the second switching device to OFF state, and forcibly puts the power path into a blocked state, to fix the lighting section to a lighting-off state when the load is activated in the charging.

11. The electronic apparatus according to claim 7, wherein the control circuitry fixes the lighting state of the lighting section according to supply state of the power received by the power reception circuitry and a power consumption state of the load when the load is activated in the charging.

12. The electronic apparatus according to claim 11, wherein when a generation period of surplus power is relatively high rate, the control circuitry forcibly puts the power path into the conductive state to fix the lighting section to the lighting state, and when the generation period of the surplus power is relatively low rate, the control circuitry forcibly puts the power path into the blocked state to fix the lighting section to the lighting-off state, the surplus power being obtained by subtracting power consumed by the load from the power received by the power reception circuitry, and the surplus power being used in charging to the battery.

13. The electronic apparatus according to claim 1, wherein when the load is activated in the charging and when a charged amount in the battery is lower than a predetermined threshold, the control circuitry sets the first switching device to the OFF state.

14. The electronic apparatus according to claim 1, wherein the control circuitry is configured to forcibly set a power path on a preceding side of the load to a predetermined state when the load is activated in the charging to the battery.

15. The electronic apparatus according to claim 1, wherein the charging circuitry is configured to perform charging to the battery based on the power provided to the charging circuitry by being controlled by the control circuitry.

16. The electronic apparatus according to claim 1, wherein the control circuitry is configured to control power provided to the charging circuitry based on power obtained by subtracting the power consumed by the load from the power received by the power reception circuitry.

17. The electronic apparatus according to claim 1, wherein a lighting section for informing outside of the apparatus state is fixed to a lighting state in the mode of informing outside of the apparatus state.

18. A feed system comprising:
one or more electronic apparatuses; and
a feed unit configured to transmit power to the electronic apparatuses with use of a magnetic field or an electric field,
wherein each of the electronic apparatuses comprises:
  power reception circuitry configured to receive power transmitted via a magnetic field or an electric field;
  a battery;
  charging circuitry configured to perform charging to the battery based on the power received by the power reception circuitry;
  a state informing section configured to inform outside of an apparatus state of itself, the state informing section including a light emitting element;
  a load configured to perform a predetermined operation;
    control circuitry configured to:
      control the charging circuitry and the load;
      detect whether the load is activated or not in the charging to the battery; and
      in a case that it is detected that the load is activated in the charging to the battery, forcibly fix an informing mode by the state informing section to a mode of informing outside of the apparatus state irrespective of presence of a surplus power, the surplus power being obtained by subtracting a power consumed by the load from the power received by the power reception circuitry,
  wherein the light emitting element is connected to the load and connected to a first switching element provided on a power supply path, and
  wherein the first switching element is configured to be set to an OFF state in the case that it is detected that the load is activated in the charging to the battery.

19. The feed system according to claim 18, wherein a source of the first switching element is connected to an input side of the light emitting element and a drain of the first switching device is connected to the load.

20. The electronic apparatus according to claim 19, wherein the source of the first switching element is further connected to an output terminal of the charging circuitry.

* * * * *